(12) United States Patent
Furukawa et al.

(10) Patent No.: US 6,755,388 B2
(45) Date of Patent: Jun. 29, 2004

(54) PINCH VALVE

(75) Inventors: Shigenobu Furukawa, Miyazaki (JP); Takeshi Hamada, Miyazaki (JP)

(73) Assignee: Asahi Organic Chemicals Industry Co., LTD, Nobeoka (JP)

( * ) Notice: Subject to any disclaimer, the term of this patent is extended or adjusted under 35 U.S.C. 154(b) by 141 days.

(21) Appl. No.: 10/182,760
(22) PCT Filed: Dec. 5, 2001
(86) PCT No.: PCT/JP01/10648
  § 371 (c)(1),
  (2), (4) Date: Mar. 4, 2002
(87) PCT Pub. No.: WO02/46648
  PCT Pub. Date: Jun. 13, 2002

(65) Prior Publication Data
US 2003/0010946 A1 Jan. 16, 2003

(30) Foreign Application Priority Data
Dec. 5, 2000 (JP) .................. 2000-370267
Jun. 13, 2001 (JP) .................. 2001-179207

(51) Int. Cl.⁷ .............................. F16K 7/04
(52) U.S. Cl. .............................. 251/5; 251/62
(58) Field of Search .......... 251/5, 7, 62, 285

(56) References Cited

U.S. PATENT DOCUMENTS 4,518,145 A * 5/1985 Keltz et al. ................. 251/5
4,899,783 A * 2/1990 Yusko, Jr. et al. ......... 137/556

FOREIGN PATENT DOCUMENTS

| JP | 51-69126 | 6/1976 |
| JP | 61-146664 | 9/1986 |
| JP | 1-299371 | 12/1989 |
| JP | 7-103396 | 4/1995 |

* cited by examiner

Primary Examiner—Edward K. Look
Assistant Examiner—John K Fristoe, Jr.
(74) Attorney, Agent, or Firm—Burns, Doane, Swecker & Mathis LLP

(57) ABSTRACT

A pinch valve of the invention comprising an elastic tube body 1, a cylinder body 4 having a cylinder portion 2 and a cylinder cover 3, a piston 11 sliding on the inner periphery of the cylinder body, a pressing piece 15 fixed to a connecting portion 13 suspended from the piston, a body 16 joined to the cylinder body and having a groove 17 receiving the tube body 1, a pair of connecting body carriers 20 engaged with grooves of the body and having a through-hole 26 receiving the tube body 1, a first and a second space portions 8, 7 formed above and under the piston 11, respectively, and a pair of air ports 10, 9 respectively communicating with the first and second space portions 8, 7.

The whole pinch valve is made compact in construction.

14 Claims, 23 Drawing Sheets

PINCH VALVE

TECHNICAL FIELD

The present invention relates to a pinch valve used in a fluid transport pipeline in various industrial fields, such as chemical factories, semiconductor production, food processing, biotechnology or the like, and more particularly, to a pinch valve which is compact and mitigates the damage a tube body suffers during opening and the closing of the valve.

BACKGROUND ART

Hitherto, various pinch valves have been proposed, and an example is disclosed in Japanese Examined Utility Model Publication No. 45-3264. According to this publication, as shown in FIGS. 27 and 28, in two upper and lower pistons 41, 42 fitted in a cylinder 40 on a leg member 39 constituted by a leg stand 37 and leg rods 38, the upper piston 41 is fixed to the upper end of a shaft rod 43 and the lower piston 42 is fixed to the upper end of a pipe shaft 44 loosely fitted on the shaft rod 43. On the lower portion of the pipe shaft 44 is provided a wing piece 45 which is fixed to a lower pressing piece 47 via connecting bars 46. On the other hand, an upper pressing piece 48 is fixed to the lower end of the shaft rod 43. Also, the center portion of a valve tube body 51 supported by two lateral rods 50 spanning between flanges 49 fitted on both ends of the flow passage and the leg members 39 is pressed by the upper and lower pressing pieces 48, 47, then the upper and lower pressing pieces 48, 47 connected to the pistons 41, 42 are symmetrically moved up and down by suitably forcing compressed air into holes 52, 53, 54 in the cylinder 40, so that the valve tube body 51 is opened and closed.

Now, at the present, in an apparatus for manufacturing semiconductors in which various pipeline and control devices are arranged and complicated pipeline design is performed, allowing the apparatus per se to be compact has been required. As a result, a pinch valve used in the pipeline of the apparatus must be compact in order to save space, thus making the pinch valve used in the apparatus compact an important matter. Also, a pinch valve able to regulate a very small flow rate is required.

However, in the pinch valve described as above, since the actuator and the valve body are constituted as separate components, and the leg member 39, the leg stand 37 and the wing piece 45 are provided between the cylinder 40 and the valve tube body 51 which is a flow passage, the overall height of the valve is very large and thus the valve cannot be made compact. Consequently, the above pinch valve cannot be used as a pinch valve in the pipeline of a semiconductor manufacturing apparatus. Also, since, in the pinch valve of such construction, it is difficult to optionally adjust the degree of opening the valve tube body, adjustment of a very small flow rate cannot be performed.

DISCLOSURE OF INVENTION

The present invention has been conceived in view of the problems of the prior art as stated above, and the purpose of this invention is to provide a pinch valve the overall height of which is low in comparison with the conventional pinch valve, which is compact, which remarkably improves the durability of the tube body pipelined in the apparatus during opening and closing of the valve, and which is able to adjust a very small flow rate.

In order to achieve the above purpose, as a result of extensive research, the inventors have found that a pinch valve could be made very compact by integrally constituting a drive and a valve body. That is, explaining the constitution of this invention with reference to FIGS. 1 to 8, a pinch valve according to a first embodiment of the invention is characterized in that it comprises a tube body 1 made of an elastic body, a cylinder body 4 having a cylinder portion 2 thereinside and joined to a disk-like cylinder cover 3 at the upper portion thereof, a piston 11 sliding up and down on the inner periphery of the cylinder portion 2 in a sealing manner and having a connecting portion 13 suspending from the center of the lower surface of the piston to penetrate a through hole 5 provided in the center of the lower surface of the cylinder body 4 in a sealing manner, a pressing piece 15 fixed to the lower end of the connecting portion 13 of the piston 11 and contained in an oval slit 6 provided on the bottom surface of the cylinder body 4 perpendicularly to the axis of a flow passage, a body 16 joined and fixed to the lower end surface of the cylinder body 4, having a groove 17 for receiving the tube body 1 on the axis of the flow passage and having grooves 18 for receiving connecting body carriers 20 which are arranged on both ends of the groove 17 and deeper than the groove 17, a pair of connecting body carriers 20 each having a fitting portion 21 fitted in the groove 18 of the body 16 at one end of the carrier 20 and a connecting body carrier port 23 on the inner surface of the other end of the carrier 20 and having a through-hole 26 for receiving the tube body 1, and a pair of air ports 9, 10 provided on the peripheral side surface of the cylinder body 4 and communicating with a first space portion 7 surrounded by the bottom surface and inner periphery of the cylinder portion 2 and the lower end surface of the piston 11, and a second space portion 8 surrounded by the lower end surface of the cylinder cover 3, the inner periphery of the cylinder portion 2 and the upper surface of the piston 11.

The pinch valve according to the first invention is also characterized in that the connecting body carrier 20 is provided at a fitting portion 21 thereof with a ledge portion 22 for preventing the connecting body carrier 20 from slipping out, and the body 16 is provided at the groove 18 thereof with a recessed groove 19 for receiving the ledge portion 22 for preventing the carrier 20 from slipping out.

In addition, the pinch valve according to the first invention is characterized in that a spring 35 is installed in the second space portion 8 in the condition where the spring 35 contacts the cylinder cover 3 and the piston 11, and is also characterized in that a spring 35 is installed in the first space portion 7 in the condition where the spring 35 contacts the bottom surface of the cylinder portion 2 and the piston 11.

Further, the pinch valve according to the first invention is characterized in that a connecting body 29 having an inserting portion 31 formed with an outer diameter larger than the inner diameter of the tube body 1 at one end of the connecting body 29 and inserted in and connected to the tube body 1, a pipeline connecting portion 32 at the other end of the connecting body 29 and a flange portion 33 at the center of the connecting body 29 is fitted in and fixed to the connecting body carrier 20 by engaging a cap nut 34 with the flange portion 33 and screwing the cap nut 34 to a male screw portion 24 provided on the outer periphery of the connecting body carrier 20.

Also, the pinch valve is characterized in that the material of the tube body 1 is EPDM, fluororubber, silicone rubber or a composition of these materials, and is further characterized in that the tube body is made of a composition of polytetrafluoroethylene and silicone rubber.

Although the tube body 1 of the pinch valve according to the invention may be made of EPDM, fluororubber, silicone rubber or an elastic body such as a composition of fluororubber and silicone rubber and is not limited to these materials, a composition of fluororubber and silicone rubber is especially preferable.

Also, although the cylinder body 4 and the body 16 may be made of a material having rigidity, such as metal or plastic, and thus the materials of those components are not especially limited, a fluororesin plastic, such as PVC, PVDF or the like is especially preferable.

Furthermore, explaining the constitution of a pinch valve according to the second invention with reference to FIGS. 15 to 26, the pinch valve is characterized in that it comprises a cylinder body 101 having a cylinder portion 115 provided at the upper portion of the inner surface thereof with a screw portion 114 for adjusting the opening degree and an air port 116 communicating with the lower end portion of the cylinder portion 115, a cylindrical handle 103 having a recess 117 receiving a spring 106 at the lower portion thereof and having a screw portion 118 screwed with the screw portion 114 for adjusting the opening degree at the outer periphery of the lower portion of the handle 103, a disk-shaped spring carrier 105 clamping the spring 106 with the upper end surface of the handle recess portion 117, a connecting bar 104 clamping the spring 106 between the handle 103 and the spring carrier 105 by engaging the connecting bar 14 with the upper portion of the handle 103 and by joining the lower end surface of the connecting bar 104 to the spring carrier 105, a lock nut 110 screwed to a screw portion 118 of the handle 103 to fix the position of the handle 103, a piston 107 sliding up and down on the inner periphery of the cylinder portion 115 in a sealing manner and having a connecting portion 120 suspending from the center of the piston 107 to penetrate a through-hole 119 provided on the center of the lower surface of the cylinder body 101 in a sealing manner, a pressing piece 108 fixed to the lower end portion of the connecting portion 120 and contained in an oval slit 121 provided on the lower end portion of the cylinder body 101 perpendicularly to the axis of the flow passage, a body 102 joined and fixed to the lower end surface of the cylinder body 101 and having a groove 129 which receives a tube body 109 of an elastic body on the axis of the flow passage, and connecting portions connecting the tube body 109 to the other tubes at both sides of the body.

Also, the second invention is characterized in that the handle 103, the spring carrier 105, the connecting bar 104 and the spring 106 are integrally assembled by a bolt 122 penetrating the inside of the spring carrier 105 and the connecting bar 104, and a nut 123.

In addition, the second invention is characterized in that a connecting body 113 having at one end thereof an inserting portion 124 the outer diameter of which is larger than the inner diameter of the tube body 109 and which is inserted in and connected to the tube body 109, a pipeline connecting portion 125 at the other end of the connecting body 113 and a flange portion 126 on the center of the connecting body 113, is fitted in and fixed to a connecting body carrier 111 to constitute the connecting portion by engaging cap nut 112 with the flange portion 126 and screwing the cap nut 112 to a male screw 128 provided on the outer-periphery of the connecting body carrier 111.

Further, the second invention is characterized in that the material of the tube body 109 is EPDM, fluororubber, silicone rubber, or a composition of these materials, and is also characterized in that the tube body 109 is made of a composition of PTFE and silicone rubber.

Although the tube body 109 of the pinch valve according to the second invention may be made of EPDM, fluororubber, silicone rubber or a composition of fluororubber and silicone rubber and is not especially limited to these materials, a composition of fluororubber (for example, PTFE, etc.) and silicone rubber is especially preferable.

Moreover, although the cylinder body 101, the body 102 and the handle 103 may be made of a material having rigidity, such as metal or plastic and thus the materials of those components are not especially limited, a plastic of fluororesin resin, such as PVC, PVDF or the like is especially preferable.

Lastly, although the connecting body 113 constituting the connecting portion may be made of a material having chemical resistance, such as plastic or the like and thus the material of the connecting body is not especially limited, a fluororesin resin, such as PTFE, PVDF, PFA or the like is especially preferable.

BEST MODE OF CARRYING OUT THE INVENTION

Embodiments of the present inventions will be explained below with reference to the drawings.

Figure 1:
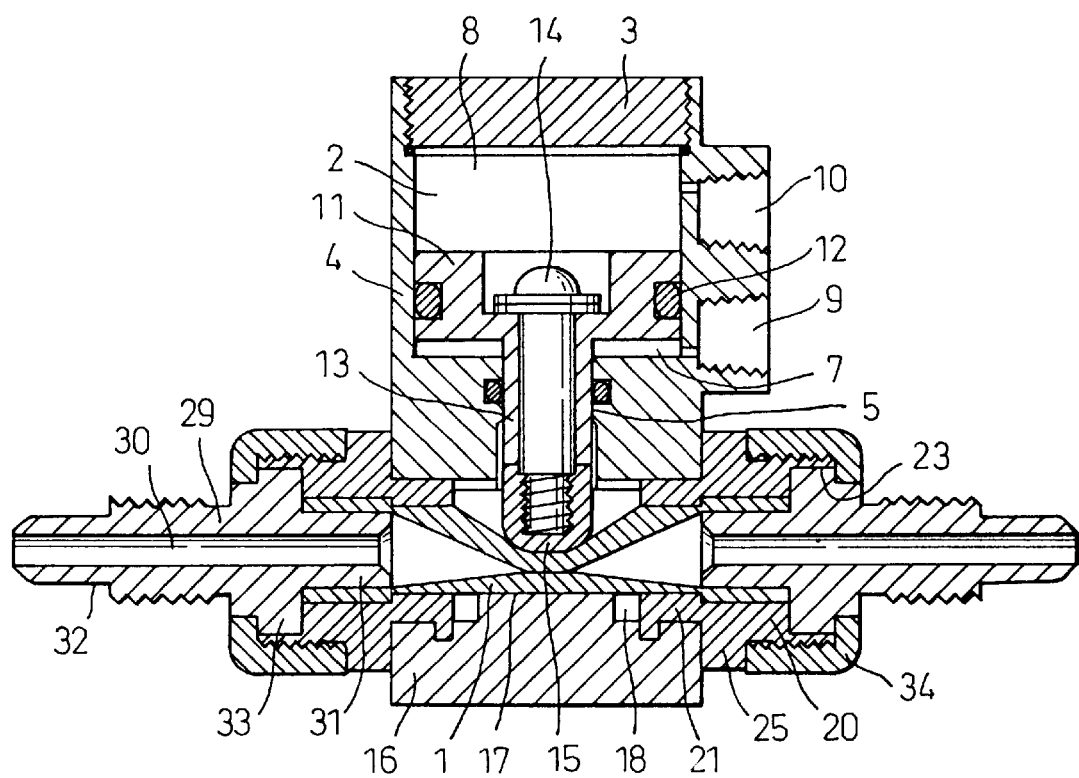
FIG. 1 is a longitudinal cross section showing the closed condition of a first embodiment of a pinch valve according to a first invention of the present inventions.
Figure 2:
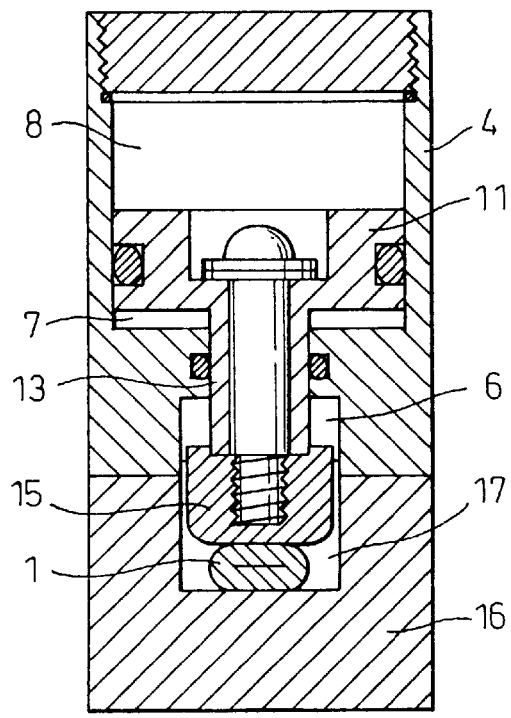
FIG. 2 is a longitudinal cross section viewing FIG. 1 from the side (in the direction of the flow passage)
Figure 3:
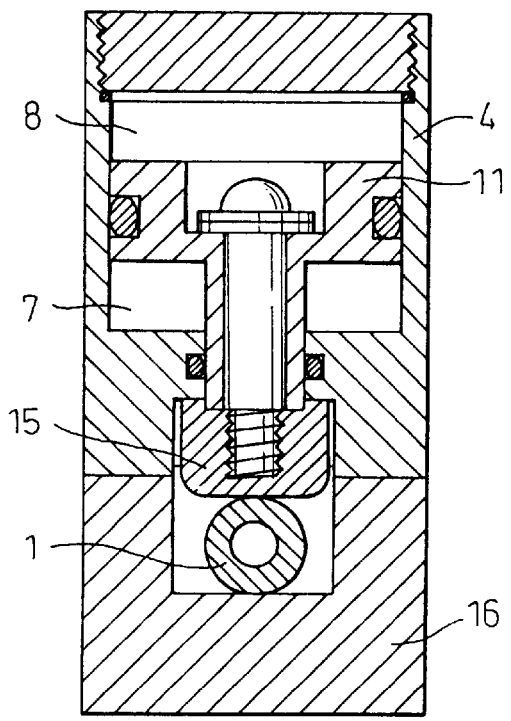
FIG. 3 is a longitudinal cross section showing the opened condition of FIG. 2.
Figure 4:
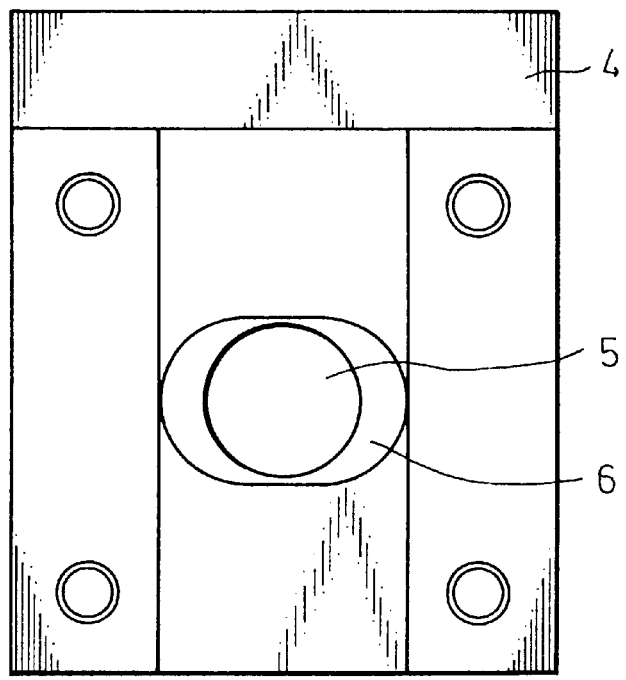
FIG. 4 is a bottom view of the cylinder body in FIG. 1.
Figure 5:
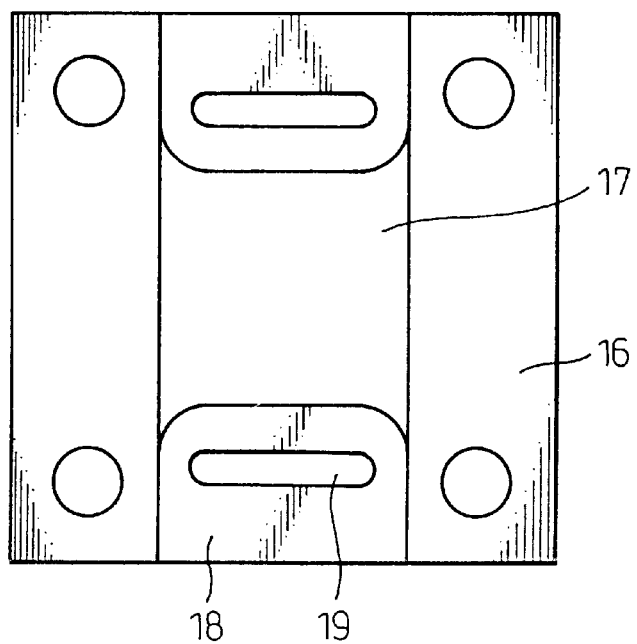
FIG. 5 is a plan view of the body in FIG. 1.
Figure 6:
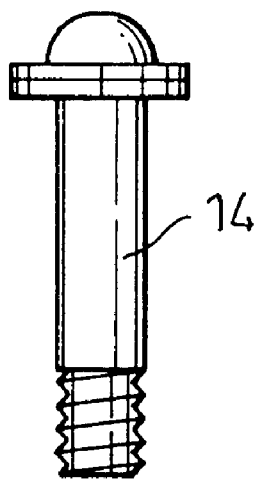
FIG. 6 is an exploded front view of a fixing bolt, a piston and a pressing piece.
Figure 6:
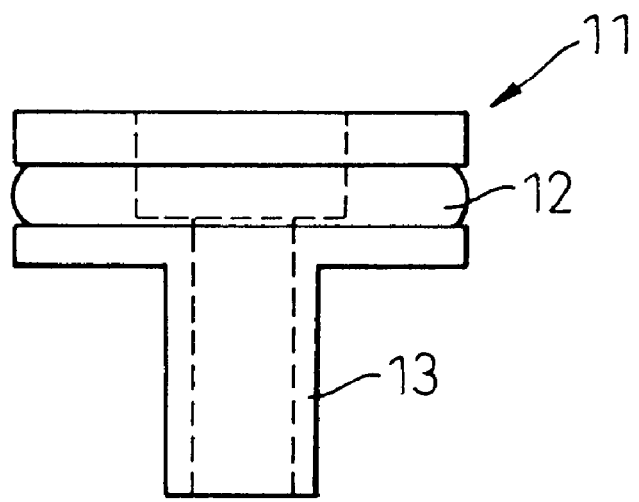
Figure 6:
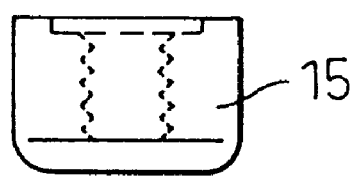
Figure 7:
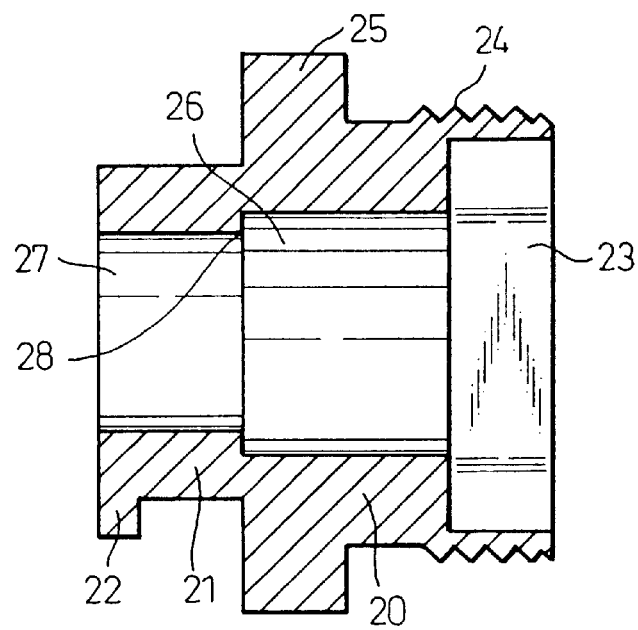
FIG. 7 is a longitudinal cross section of the connecting body carrier in FIG. 1.
Figure 8:
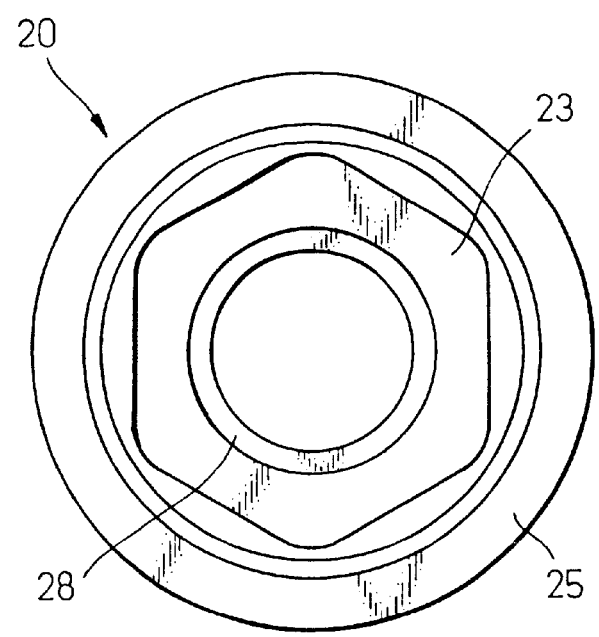
FIG. 8 is a right side view of the connecting body in FIG. 7.
Figure 9:
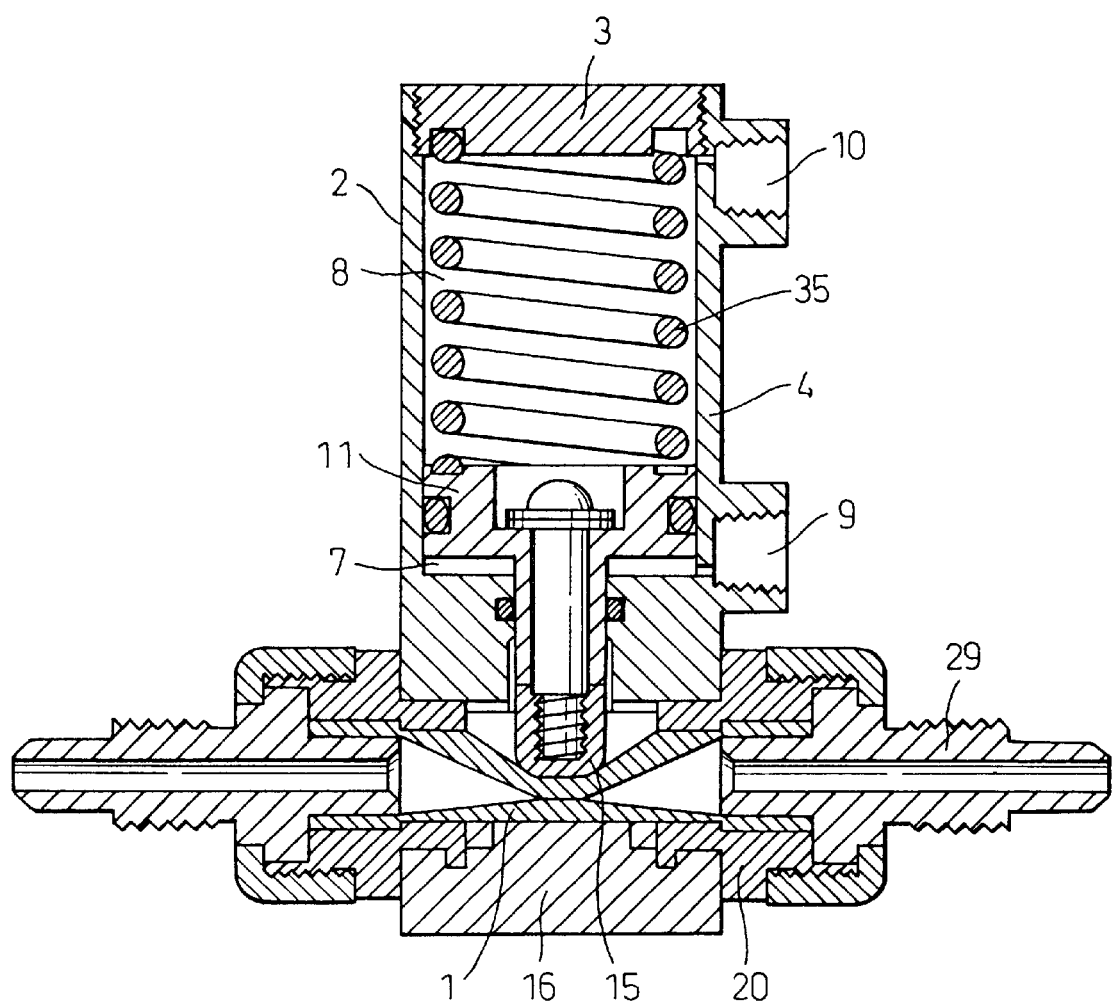
FIG. 9 is a longitudinal cross section showing the closed condition of a second embodiment of a pinch valve according to the first present invention.
Figure 10:
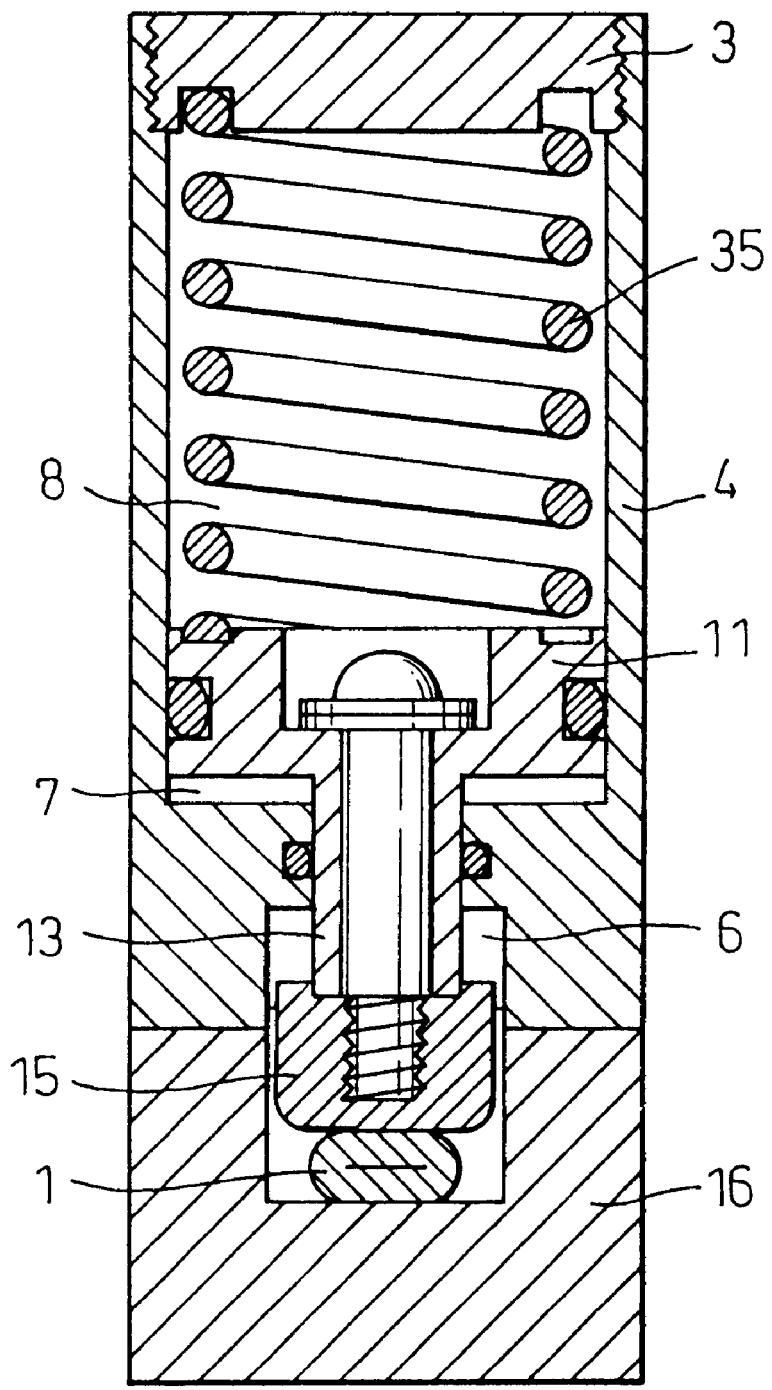
FIG. 10 is a longitudinal cross section of the pinch valve in FIG. 9 viewed from the side (in the direction of the flow passage)
Figure 11:
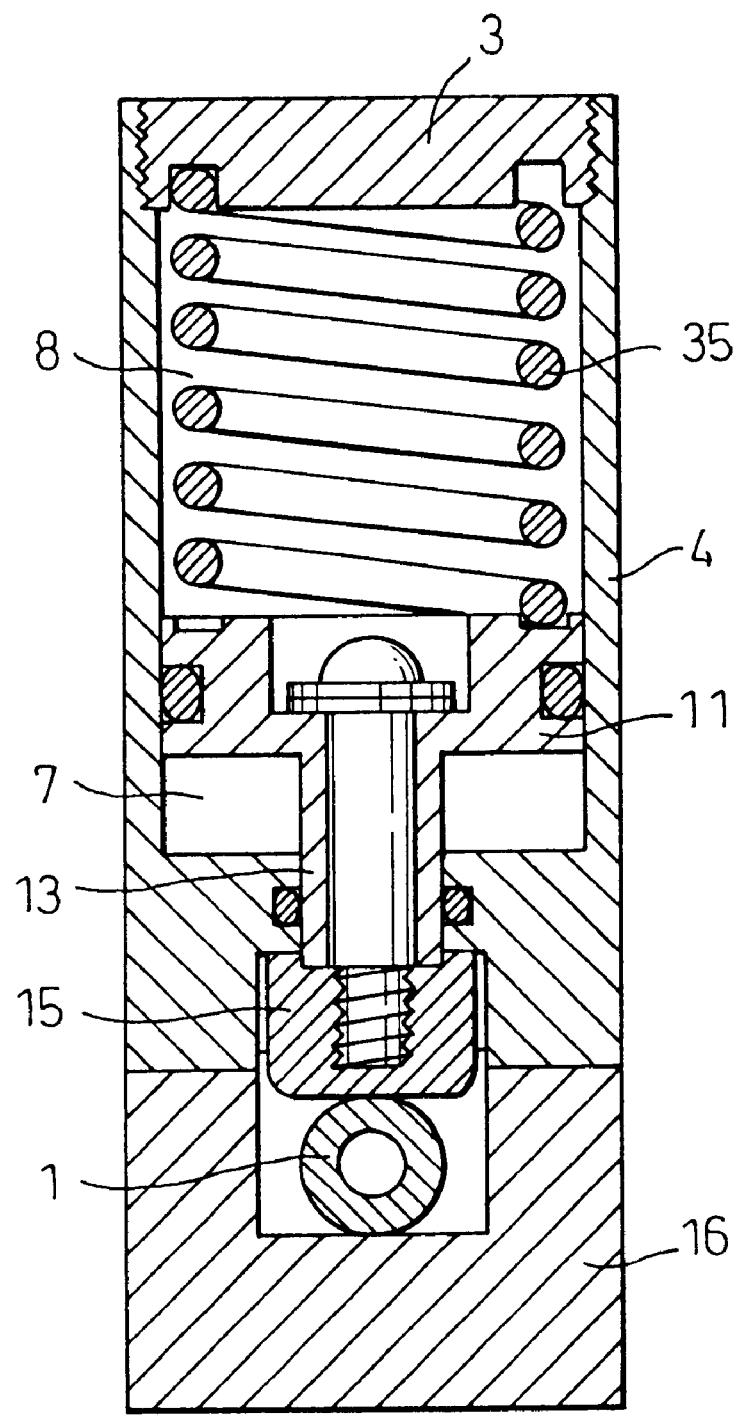
FIG. 11 is a longitudinal cross section showing the opened condition of FIG. 10.
Figure 12:
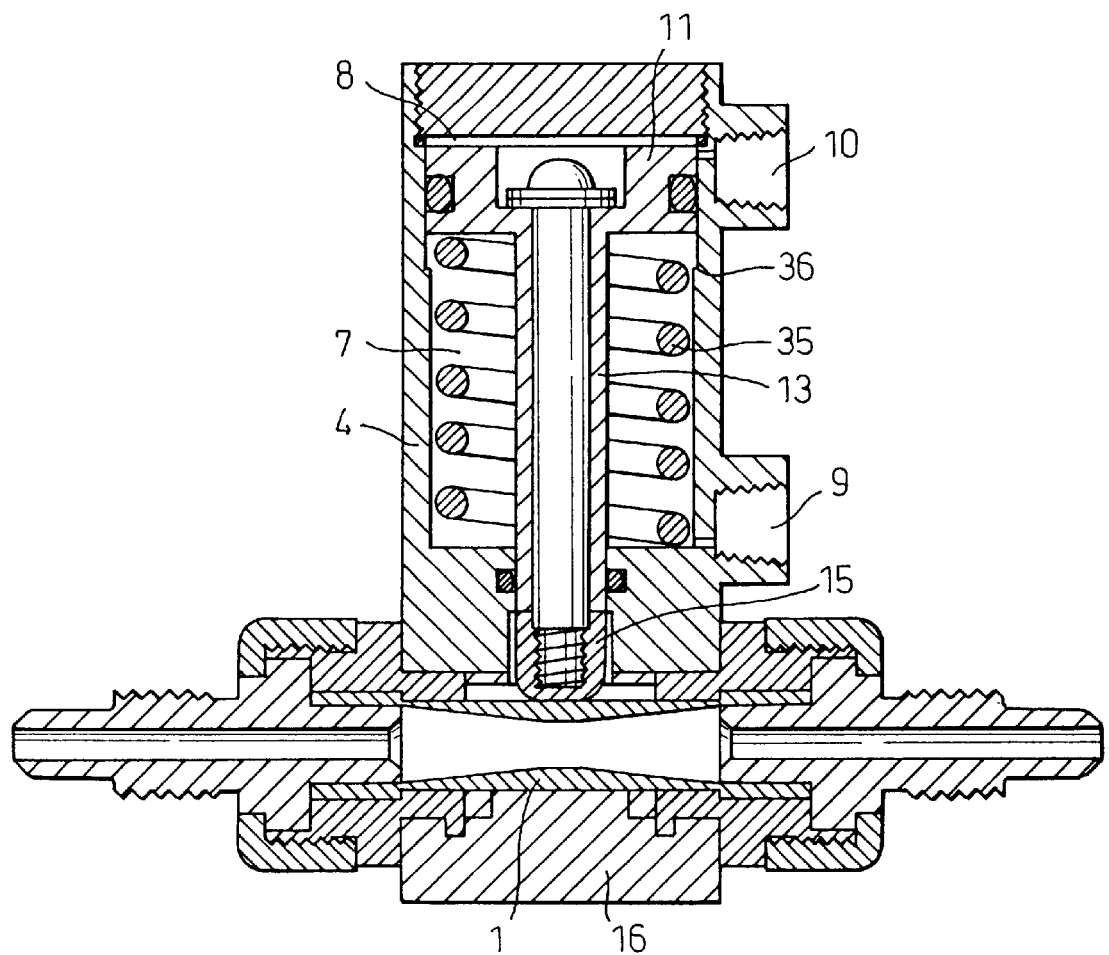
FIG. 12 is a longitudinal cross section showing the opened condition of a third embodiment of the pinch valve according to the first present invention.
Figure 13:
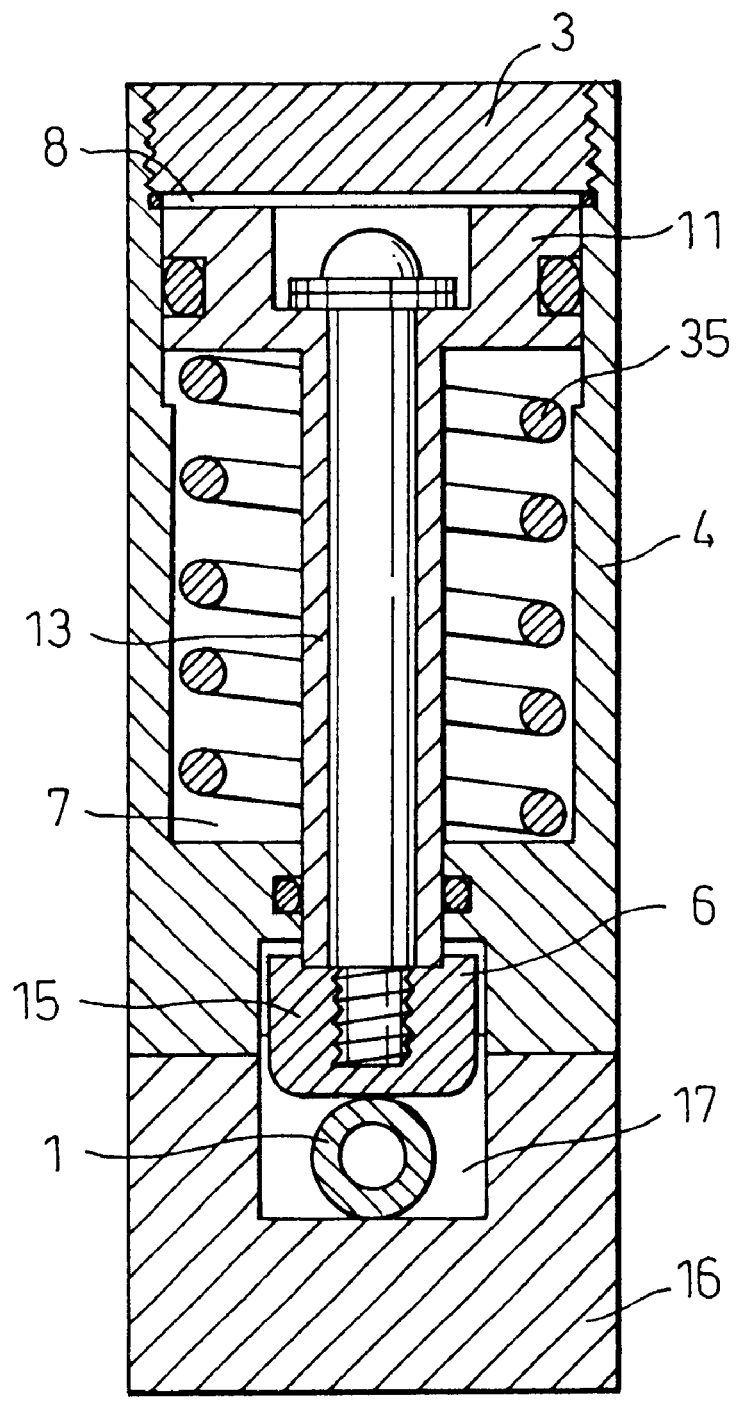
FIG. 13 is a longitudinal cross section viewing the pinch valve in FIG. 12 from the side (in the direction of the flow passage)
Figure 14:
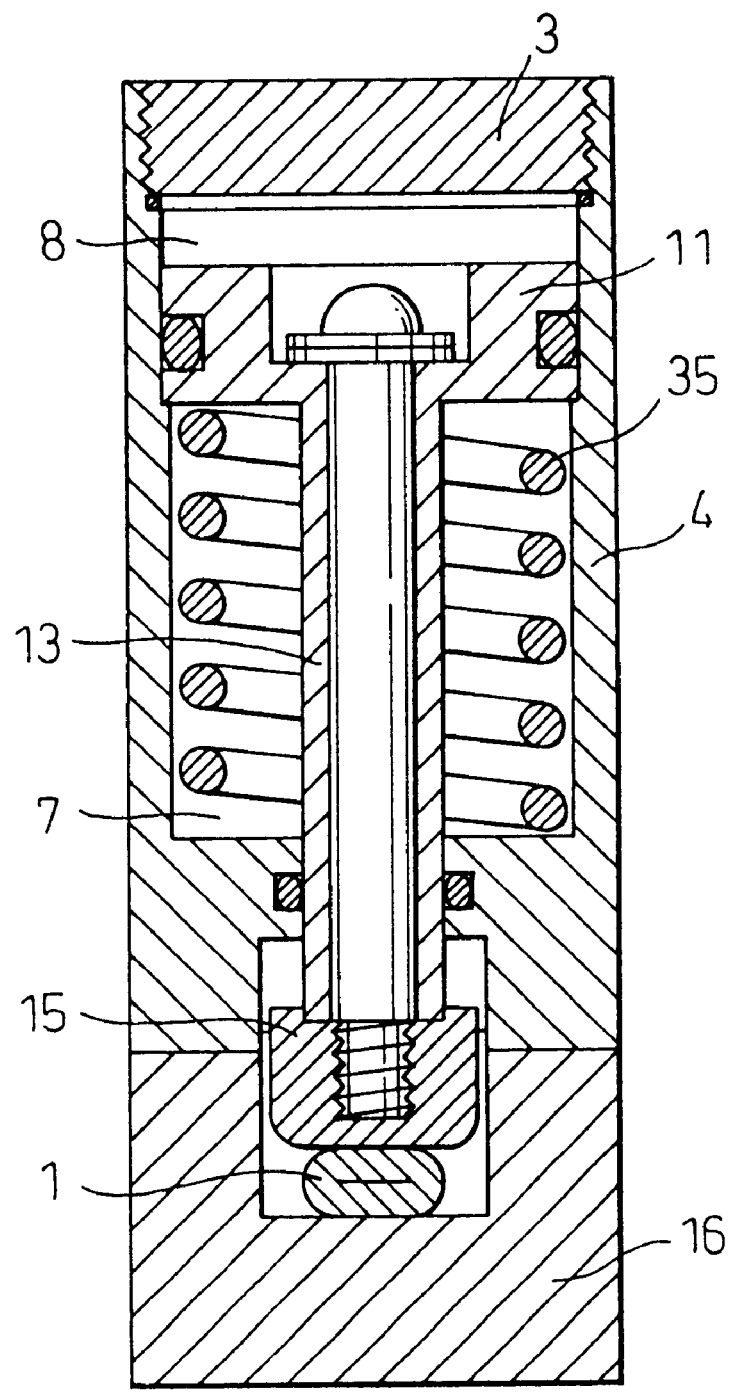
FIG. 14 is a longitudinal cross section showing the closed condition of FIG. 13.

Embodiments of a first embodiment of the present inventions will now be explained. However, it should be noted that the invention is not limited to such an embodiment. FIG. 1 is a longitudinal cross section of embodiment of a pinch valve according to the first invention showing the closed condition. FIG. 2 is a longitudinal cross section viewing the pinch valve in FIG. 1 from the side (in the direction of the flow passage). FIG. 3 is a longitudinal cross section showing the opened condition of FIG. 2. FIG. 4 is a bottom view of a cylinder body in FIG. 1. FIG. 5 is a plan view of a body in FIG. 1. FIG. 6 is an exploded front view of a fixing bolt, a piston and a pressing piece. FIG. 7 is a longitudinal cross section of a connecting body carrier in FIG. 1. FIG. 8 is a right side view of the connecting body in FIG. 7. FIG. 9 is a longitudinal cross section of an another embodiment of the pinch valve according to the invention showing the closed condition. FIG. 10 is a longitudinal cross section of the pinch valve in FIG. 9 viewed from the side (in the direction of the flow passage). FIG. 11 is a longitudinal cross section of FIG. 10 showing the opened condition. FIG. 12 is a longitudinal cross section of a third embodiment of the pinch valve according to the first invention showing the opened condition. FIG. 13 is a longitudinal cross section of the pinch valve in FIG. 12 viewed from the side (in the direction of the flow passage). FIG. 14 is a longitudinal cross section of FIG. 13 showing the closed condition.

A first embodiment of a pinch valve made of PVDF according to the first invention will be explained below on the basis of FIGS. 1 to 8. Reference numeral 1 designates a tube body which is made of a composition of fluororubber and silicone rubber and in which a fluid flows. The tube body 1 is formed having a predetermined thickness, for example, by adhering and laminating multiple layers of PTFE sheets impregnated with silicone rubber. Although the material of the tube body 1 is a composition of fluororubber and silicone rubber in this embodiment, the tube body may be made of an elastic body, such as EPDM, silicone rubber, fluororubber or a composition of these materials, and it is not especially limited.

Reference numeral 4 designates a cylinder body which has a cylinder portion 2 with a cylindrical space and to which a disk-like cylinder cover 3 is screwed at the upper end portion of the cylinder body 4 via an O-ring. In the center of the lower surface of the cylinder body 4 are continuously provided a through-hole 5 penetrated by a piston connecting portion 13 and an oval slit 6 containing a pressing piece 15 (see FIG. 4). Also, the cylinder body 4 is provided at the peripheral side thereof with an air port 9 which communicates a first space portion 7 defined by the inner periphery and the bottom surface of the cylinder portion 2 with an outside air supply device (not shown), and with another air port 10 which communicates a second space portion 8 defined by the inner periphery of the cylinder portion 2, the lower end surface of the cylinder cover 3 and the upper end surface of the piston 11 with the outside air supply device.

The piston 11 is formed as a disk and is installed with an O-ring 12 on the peripheral side thereof, the piston 11 being fitted in the cylinder portion 2 to move up and down in a sealing manner. The piston connecting portion 13 is provided on the piston so as to be suspended from the center of the piston and penetrate the through-hole 5 provided in the center of the lower surface of the cylinder body 4 in a sealing manner, and is fixed with the pressing piece 15 at the tip portion thereof. Further, fixation of the pressing piece 15 may be performed such that the connecting portion 13 is formed as a bar and the pressing piece is fixed to the tip portion of the connecting portion 13 by screwing, adhesion or welding, and it is not especially limited.

The pressing piece 15 is formed such that the portion for pressing the tube body 1 has a semicircular cross section. Also, the pressing piece 15 is fixed to the piston connecting portion 13 to intersect the axis of the flow passage perpendicularly, and is contained in the oval slit 6 of the cylinder body 4 when the valve is opened.

Reference numeral 16 designates a body which is joined and fixed to the lower end surface of the cylinder body 4 by bolts and nuts or the like (not shown), and which is provided with a groove 17 having a rectangular cross section for receiving the tube body 1 on the axis of the flow passage. Also, at both end portions of the groove 17 are provided grooves 18 deeper than the groove 17 for receiving fitting portions 21 of connecting body carriers 20, and further in the groove 18 is provided a recessed groove 19 for receiving a slipping out preventing ledge portion 22 provided on the tip end of the fitting portion 21 of the connecting body carrier 20.

As shown in FIG. 7, the connecting body carrier 20 is formed at one end thereof with the fitting portion 21 of a rectangular cross section which is fitted in the groove 18 provided on the end of the body 16, further on the bottom of the tip of the fitting portion 21 is provided the ledge portion 22 for preventing the connecting body carrier 20 from slipping out, which is fitted in the recessed groove 19 provided in the groove 18 of the body 16. On the other hand, on the other end of the connecting body carrier 20 is provided a receiving opening 23 having a hexagonal cross section for receiving a hexagonal flange portion 33 of a connecting body 29, the cross section of which is the same as the cross section of the opening 23, and the outer periphery of the connecting body carrier 20 is provided with a male screw portion 24. On the outer periphery positioned between the male portion 24 and the fitting portion 21 is provided an annular flange portion 25 having a diameter which is nearly the same as the diagonal length of the fitting portion 21. The flange portion 25 contacts the cylinder body 4 and the body 16 and prevents the connecting body carrier 20 from moving toward the interior of both bodies. Inside the connecting body carrier 20 is provided at the fitting portion 21 a through-hole 27 having a diameter nearly equal to the outer diameter of the tube body 1, and following the through-hole 27 is provided a through-hole 26 having a diameter nearly equal to the outer diameter of the tube body 1 which has been fitted and enlarged on the fitting portion 31 of the connecting body 29 communicating with the receiving opening 23. Thus, a stepped portion 28 can be formed on the inner peripheral surface of the connecting body carrier 20, as shown in FIG. 7. The tube body 1 is clamped and fixed inside the connecting body carrier 20 by the stepped portion 28. Further, although there are provided the through-hole 27 and the through-hole 26 larger than the through-hole 27 in the embodiment, the through-hole 27 may be solely provided in the connecting body carrier 20.

The connecting body 29 has a flow passage 30 thereinside, is provided at one end thereof with the inserting portion 31 on which the tube body 1 is fitted, with the diameter of the tube body being expanded, and is provided at the other end thereof with a pipeline connecting portion 32 to which the other tube body is connected. On the center of the outer periphery of the connecting body 29 is provided the flange portion 33 of hexagonal cross section, the diameter of which is greater than both ends of the connecting body 29. The connecting body 29 is fitted and fixed in the connecting body carrier 20 not to be pivoted by fitting the flange portion 33 in the receiving opening 23 of the connecting body carrier 20 and by screwing a cap nut 34 engaged with the flange portion 33 with the male portion 24 provided on the outer periphery of the connecting body carrier 20.

As explained above, since the pinch valve of the embodiment is constituted such that a leg member, a leg stand and a wing piece are not required between the drive portion and the valve body other than the prior art pinch valve, the overall height of the valve is low, the volume of the valve is small, and thus it is very compact in comparison with the prior art pinch valve.

The operation of the pinch valve of the embodiment constituted as above is as follows.

Now, in the fully closed condition of the pinch valve shown in FIGS. 1 and 2, if compressed air is supplied into the first space portion 7 from the air port 9 while being exhausted from the second space portion 8 through the air port 10, the side periphery of the piston 11 begins to slide on the inner periphery of the cylinder portion 2 and to rise, and as a result, the pressing piece 15 rises via the connecting portion 13 suspended from the piston 11. Finally, the upper end surface of the pressing piece 15 arrives at the upper end surface of the oval slit 6 provided on the lower end surface of the cylinder body 4, the rising of the piston 11 and the pressing piece 15 is stopped, and the pinch valve is then in the fully open condition (the condition shown in FIG. 3).

If, in the fully opened condition shown in FIG. 3, the compressed air is supplied into the second space portion 8 from the air port 10 while the compressed air in the first space portion 7 is exhausted through the air port 9, the piston begins to descend due to the air pressure, and as a result, the pressing piece 15 also descends via the connecting portion 13 suspended from the piston 11. Finally, the lower end surface of the piston 11 arrives at the bottom surface of the cylinder portion 2 and the descending of the piston 11 and the pressing piece 15 is stopped, and the pinch valve is then in the fully closed condition (the condition shown in FIGS. 1 and 2). At this time, the upper end surface of the pressing piece 15 is adapted to be located within the oval slit 6 of the cylinder body 4 in order to prevent the pressing piece 15 from pivoting.

Next, a reverse operation type pinch valve which is a second embodiment of the first invention will be explained below on the basis of FIGS. 9 to 11.

Reference numeral 35 designates a spring installed in the cylinder portion 2 in a manner such that the upper end surface of the piston 11 and the lower end surface of the cylinder cover 3 contact the spring. Although a single spring 35 is installed in this embodiment, the number of springs may be increased, depending on the urging force required.

The remaining constitution of the second embodiment is similar to the first embodiment, and thus further explanation will be omitted.

The operation of the pinch valve of the second embodiment constituted as above and the action as a reverse operating valve is as follows.

In the condition where the pinch valve is fully closed as shown in FIGS. 9 and 10, if compressed air is supplied into the first space portion 7 from the air port 9, the piston 11 begins to rise in the cylinder portion 2, with the spring 35 being compressed, and as a result, the pressing piece 15 rises via the connecting portion 13 suspended from the piston 11. Further, the rising of the pressing piece 15 continues and finally the upper end surface of the pressing piece 15 contacts the upper end surface of the oval slit 6 provided on the lower end surface of the cylinder body 4, and the rising of the piston 11 and the pressing piece 15 is stopped, so that the pinch valve is then in the fully open condition (the condition shown in FIG. 11).

On the other hand, in the fully open condition of the pinch valve shown in FIG. 11, if the compressed air in the first space portion 7 is released into the atmosphere through the air port 9, the piston 11 abutted on the spring 35 begins to descend due to the repulsive force of the spring 35, as the result, the pressing piece 15 descends via the connecting portion 13 suspending from the piston 11. Finally, the lower end surface of the piston 11 arrives at the bottom surface of the cylinder portion 2 and the descending of the piston 11 and the pressing piece 15 is stopped, so that the pinch valve is then in the fully closed condition (the condition shown in FIGS. 9, 10).

Next, a normal operation, type pinch valve which is a third embodiment of the first invention will be explained below on the basis of FIGS. 12 to 14.

In this embodiment, the spring 35 is installed inside the cylinder portion 2, being held by the lower end surface of the piston 11 and the bottom surface of the cylinder portion 2. On the upper region of the cylinder portion 2 is provided a stopper portion 36 over the periphery thereof to set the lowest limit of the piston 11. Although a single spring 35 is installed in this embodiment, the number of springs installed may be increased, depending on the urging force required.

Since the remaining constitution of the third embodiment is similar to the first embodiment, explanation of the constitution will be omitted.

The operation of the pinch valve of the third embodiment constituted as above and the action as a normal operating valve is as follows.

If compressed air is supplied into the second space portion 8 from the air port 10 when the pinch valve is in the fully open condition shown in FIGS. 12 and 13, the piston 11 begins to descend in the cylinder portion 2, with the spring 35 being compressed due to the air pressure, and as a result, the pressing piece 15 descends via the connecting portion 13 suspended from, the piston 11. The piston 11 continues to descend and finally the lower end surface of the piston 11 arrives at the stopper 36 to stop the descending of the piston 11 and the pressing piece 15, so that the pinch valve is then in fully closed condition (the condition in FIG. 14).

On the other hand, in the fully closed condition of the pinch valve shown in FIG. 14, if the compressed air in the second space portion 8 is released into the atmosphere through the air port, the piston 11 abutting on the spring 35 begins to rise due to the repulsive force of the spring 35, as the result, the pressing piece 15 rises via the connecting portion 13 suspended from the piston 11. Finally, the upper end surface of the piston 11 arrives at the lower end surface of the cylinder cover 3 to stop the rising of the piston 11 and the pressing piece 15, so that the pinch valve is then in the fully open condition (the condition in FIGS. 12 and 13).

Figure 15:
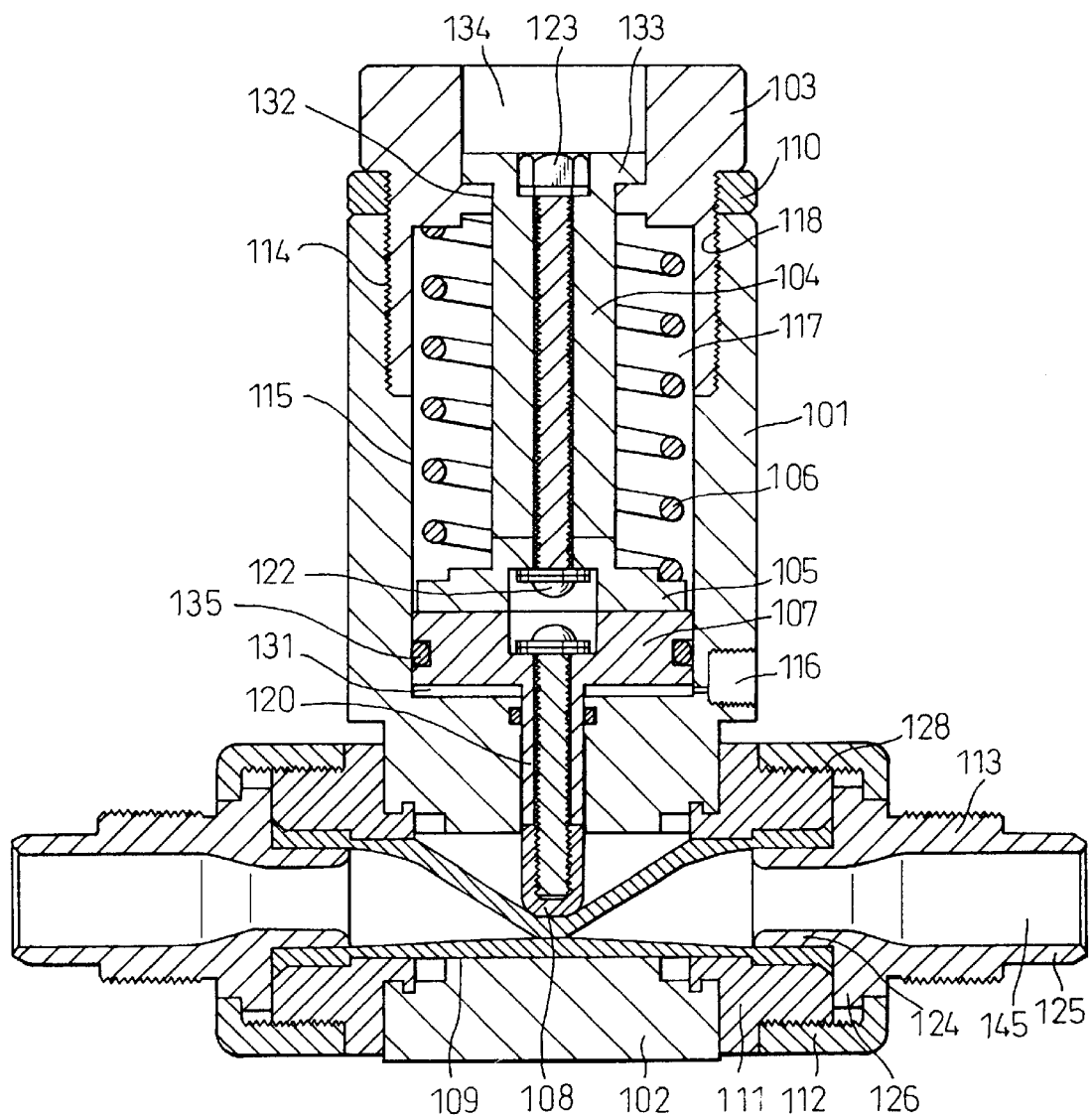
FIG. 15 is a longitudinal cross section showing the closed condition of a first embodiment of a pinch valve according to the second present invention.
Figure 16:
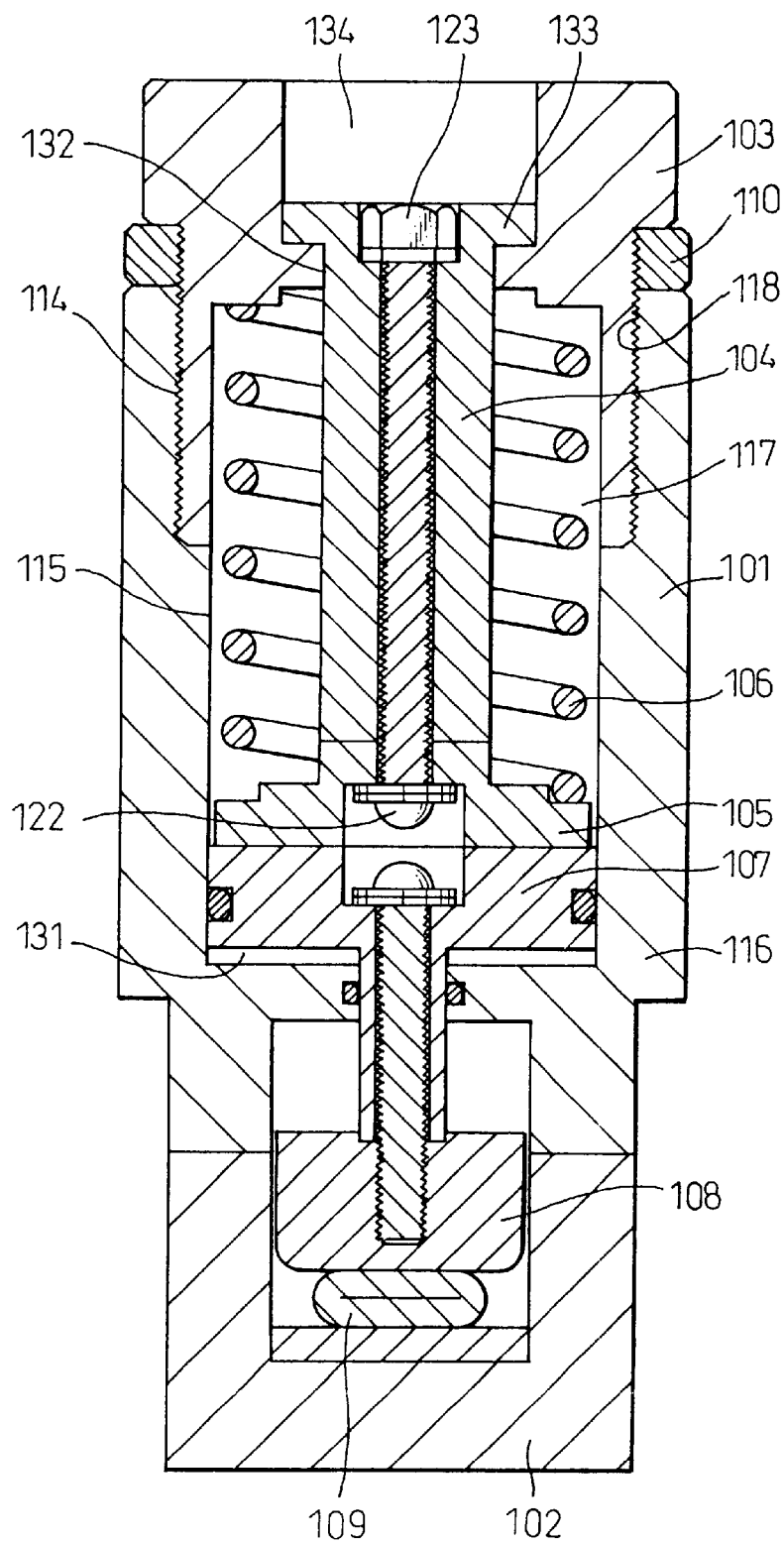
FIG. 16 is a longitudinal cross section viewing FIG. 15 from the side (in the direction of the flow passage)
Figure 17:
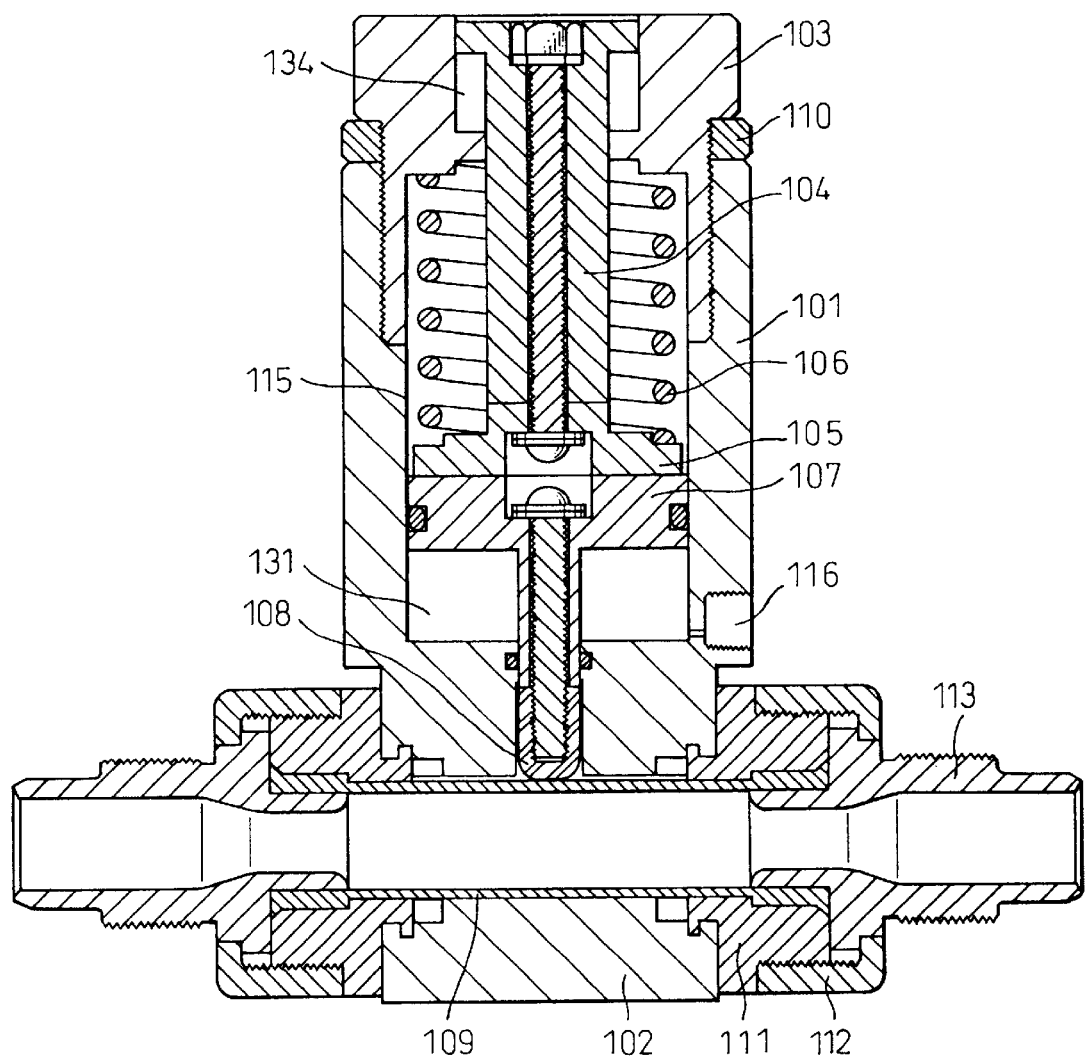
FIG. 17 is a longitudinal cross section showing the opened condition of FIG. 15.
Figure 18:
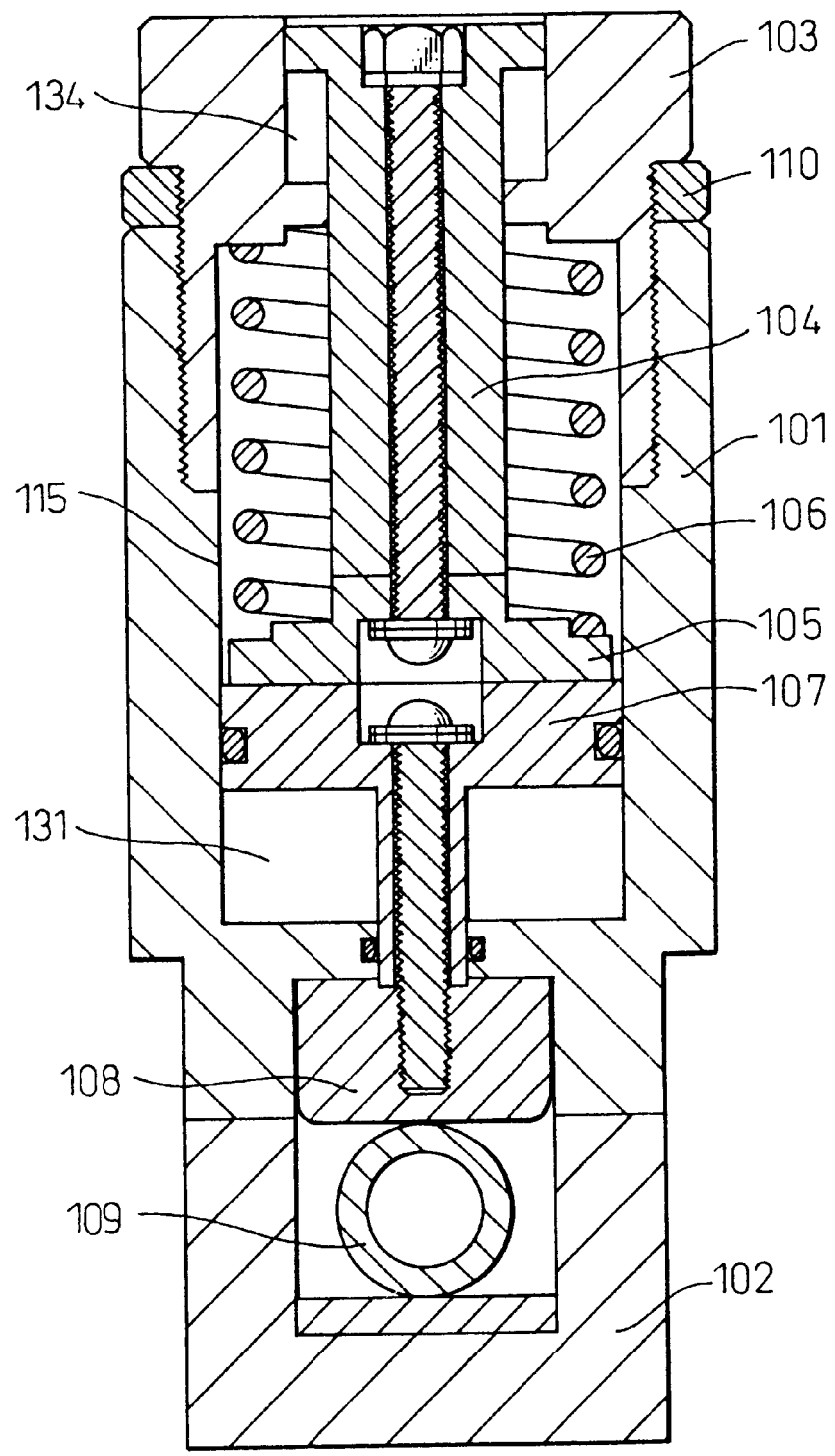
FIG. 18 is a longitudinal cross section showing the opened condition of FIG. 16.
Figure 19:
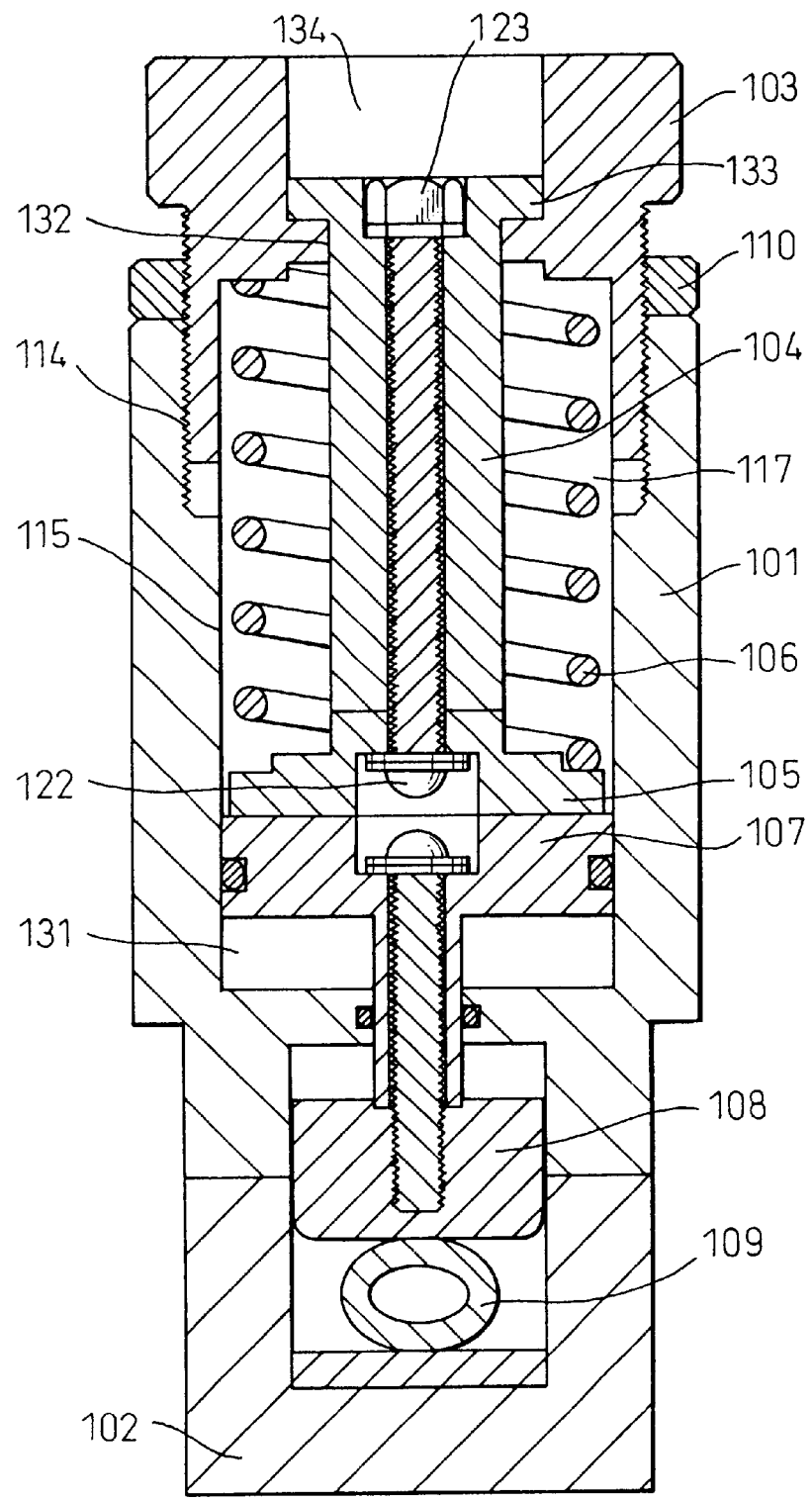
FIG. 19 is a longitudinal cross section showing the condition where the pinch valve has been adjusted to open to the medium extent.
Figure 20:
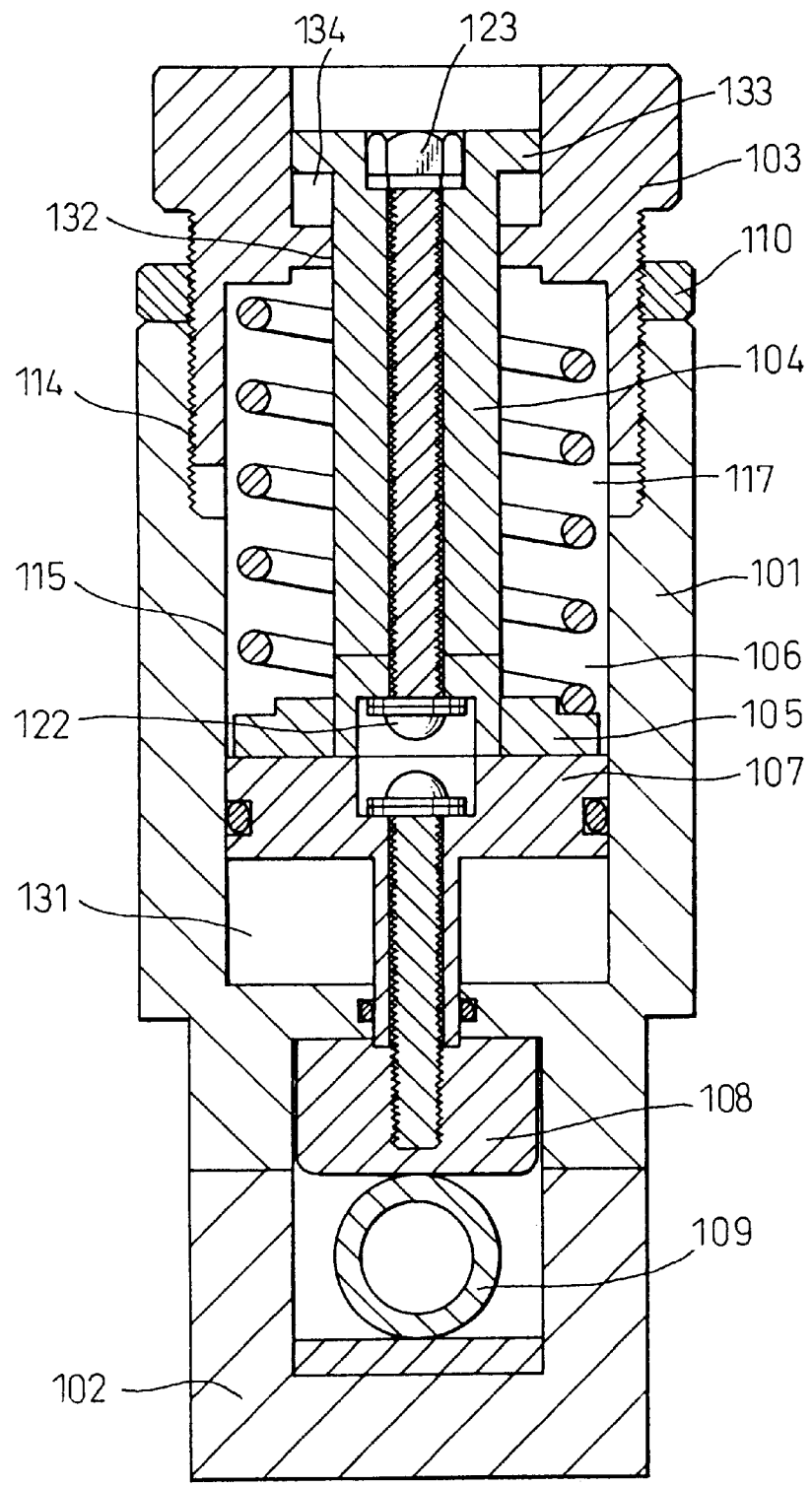
FIG. 20 is a longitudinal cross section showing the open condition of FIG. 19.

Next, the embodiments of the second invention will be explained with reference to the drawings. FIG. 15 is a longitudinal cross section showing the closed condition of a first embodiment of the pinch valve according to the second invention. FIG. 16 is a longitudinal cross section viewing the pinch valve of FIG. 15 from the side (in the direction of the flow passage). FIG. 17 is a longitudinal cross section showing the open condition of FIG. 15. FIG. 18 is a longitudinal cross section of the pinch valve in FIG. 17 viewing from the side (in the direction of the flow passage). FIG. 19 is a longitudinal cross section of the first embodiment of the pinch valve according to the invention showing the condition where the pinch valve has been adjusted to a medium opening degree. FIG. 20 is a longitudinal cross section showing the open condition of FIG. 19.

The first embodiment of the pinch valve made of PVDF according to the second invention will be explained below on the basis of the drawings.

Figure 21:
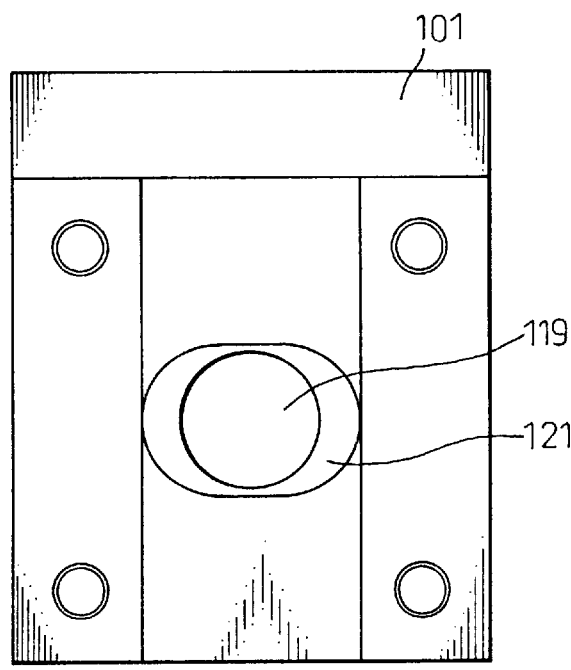
FIG. 21 is a bottom view of the cylinder body in FIG. 15.

Reference numeral 101 designates a cylinder body in which a cylinder portion 115 having a screw portion 114 at the upper portion of the inner surface of the cylinder body is provided, the screw portion 114 being screwed into a handle 103. On the center of the lower surface of the cylinder body 101 are continuously provided a through-hole 119 penetrated by a piston connecting portion 120 and an oval slit 121 containing a pressing piece 108 (see FIG. 21). Also, on the inner peripheral side surface of the cylinder body 101 is provided an air port 116 communicating a first space portion 131 defined by the lower end surface of the cylinder portion 115, i.e., the inner peripheral and bottom surfaces of the cylinder portion 115 and the lower end surface of a piston 107 with an outside air supply device, etc. (not shown).

The handle 103 is cylindrical, and is provided with a through-hole 132 penetrated by a connecting bar 104 at the center of the upper region of the handle 103, and with a recess 134 which receives the engaging portion of the connecting bar 104, i.e., a flange portion 133 of the connecting bar 104 and which has a diameter larger than the through-hole 132, at the upper region of the through-hole 132. Also, on the lower portion of the through-hole 132 is continuously provided a recess 117 receiving a spring 106. In addition, on the outer periphery of the lower region of the handle is provided a screw portion 118 screwed to the screw portion 114 of the cylinder body 1, the screw portion 118 being screwed to a lock nut 110.

Reference numeral 105 designates a disk-shaped spring carrier which clamps a spring 106, described later, by the upper end surface of the recess 117 of the handle and the upper surface of the spring carrier 105.

The connecting bar 104 engages with the recess 134 provided on the upper region of the handle 103 at the flange portion 133 provided on the upper end portion of the connecting bar 104, vertically descends in the cylinder portion 115 through the through-hole 132 of the handle 103, and is joined to the spring carrier 105 at the lower end of the connecting bar 104. In this embodiment, the connecting bar and the spring carrier are joined and fixed together by a bolt 122 inserted through the connecting bar and the spring carrier, and a nut 123. Further, fixation of the spring carrier 105 and the connecting bar 104 is not limited to fixation with a bolt and nut, but may be performed by screwing or welding.

The spring 106 is installed so as to contact the upper surface of the spring carrier 105 and the upper end surface of the recess 117 of the handle 103. Although a single spring is installed in this embodiment, the number of springs installed may be two or more, depending on the required urging force.

Further, as can be seen from the drawings, the spring 106 is integrally assembled together with the handle 103, the connecting bar 104 and the spring carrier 105 in the compressed condition by the bolt 122 and the nut 123.

Figure 25:
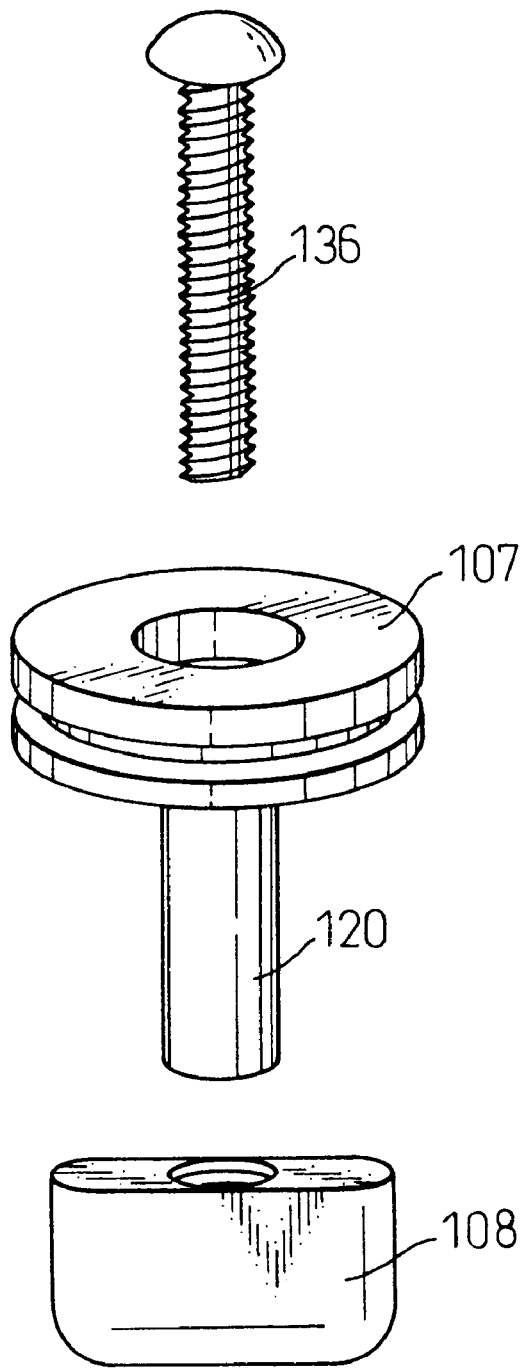
FIG. 25 is an exploded perspective view of a fixing bolt, a piston and a pressing piece.
Figure 26:
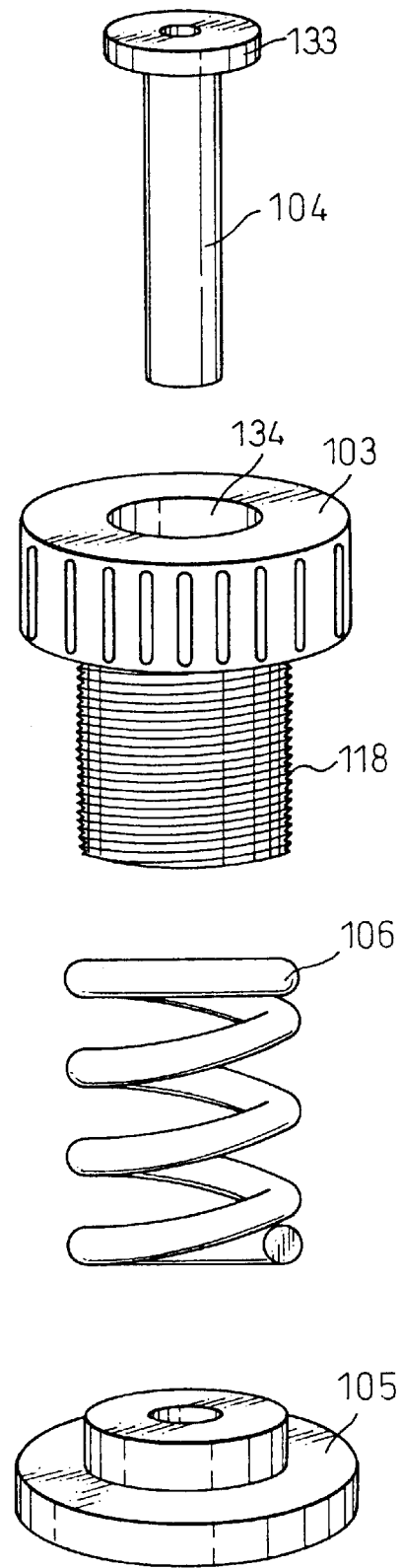
FIG. 26 is an exploded perspective view of a handle, a connecting bar, a spring carrier and a spring.
Figure 27:
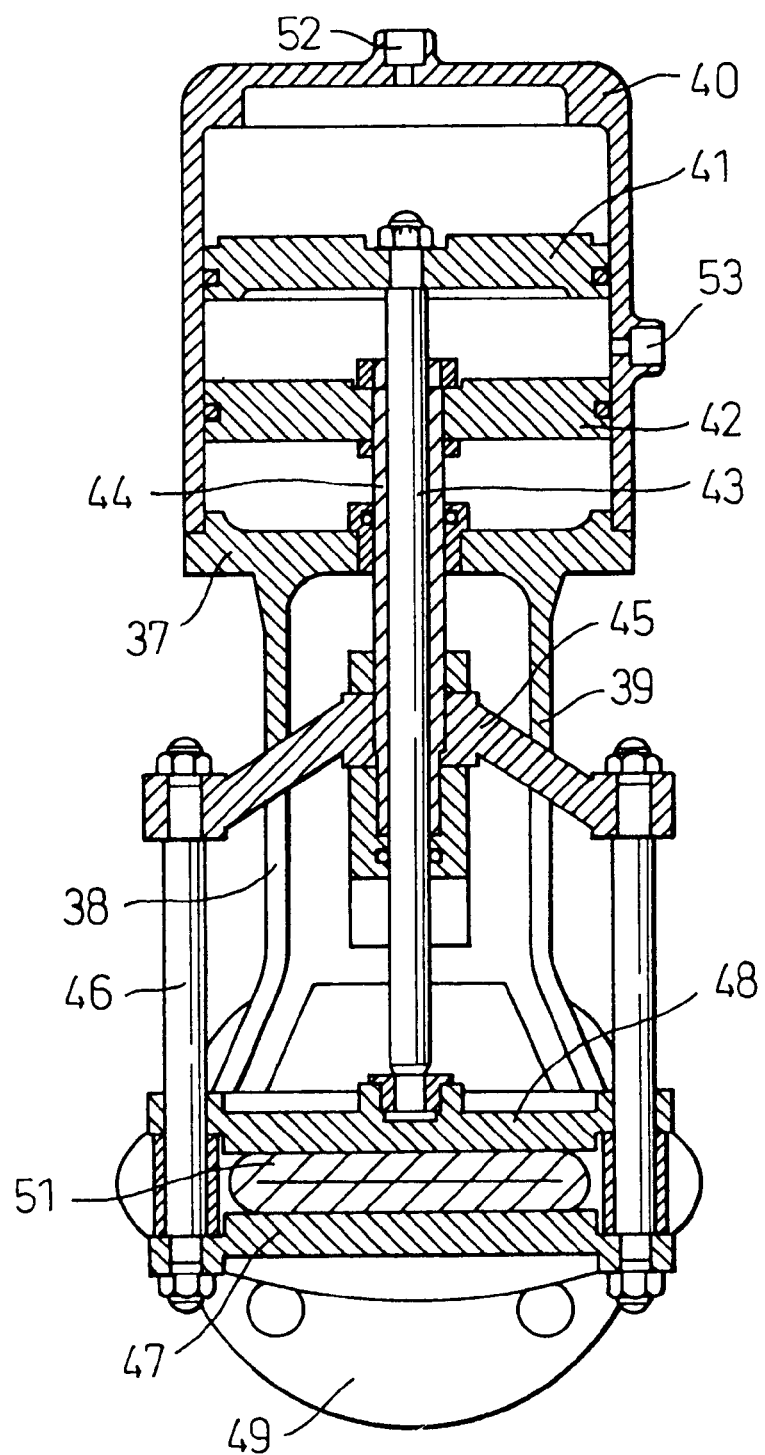
FIG. 27 is a longitudinal cross section of the prior art pinch valve.
Figure 28:
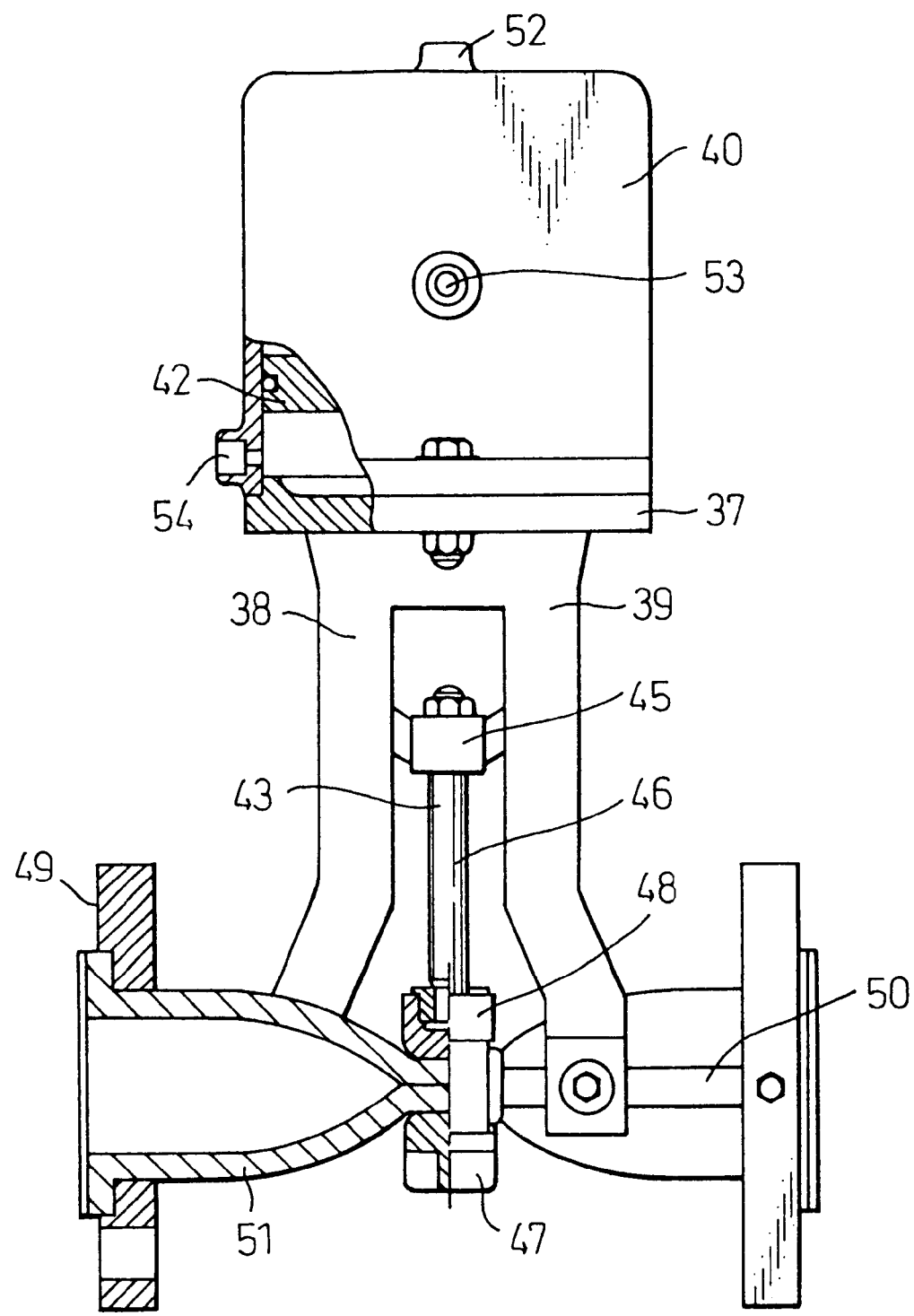
FIG. 28 is a partially cut out front view of the prior art pinch valve.

The piston 107 is designed to be disk-like and installed with an O-ring 135 on the peripheral side, always contacts the lower surface of the spring carrier 105 at the upper surface thereof, and slides on the inner periphery of the cylinder portion 115 to move up and down in a sealing manner. The connecting portion 120 suspended from the center of the piston 107 penetrates the through-hole 119 provided in the center of the lower surface of the cylinder body 101 in a sealing manner, and is fixed with a pressing piece 108 at the tip portion of the connecting portion 120. In this embodiment, the pressing piece 108 is fixed on the tip portion of a fixing bolt 136 inserted in the piston connecting portion 120 to penetrate it by screwing the pressing piece 108 to the bolt 136 (see FIG. 25). Further, fixation of the pressing piece 108 may be performed such that the connecting portion 120 is formed in bar-like and the pressing piece 108 is fixed on the tip portion of the connecting portion 120 by screwing, adhering or welding, and thus it is not especially limited.

The pressing piece 108 is formed such that the cross section of the region pressing a tube body 109 is semicircular. Also, the pressing piece 108 is fixed on the piston connecting portion 120 to perpendicularly intersect the axis of the flow passage of the body 102, and is designed to be contained in an oval slit 121 provided on the lower end of the cylinder body 101 when the valve is opened.

The tube body 109 defines a flow passage in the body 102, and is made of a composition of PTFE and silicone rubber. Namely, the tube body is formed having a predetermined thickness by adhering and laminating multiple layers of PTFE sheets impregnated with silicone rubber. Although the material of the tube body is a composition of fluororubber and silicone rubber in this embodiment, the tube body may be made of EPDM, silicone rubber, fluororubber, or a composition of these materials, and it is not especially limited.

Figure 22:
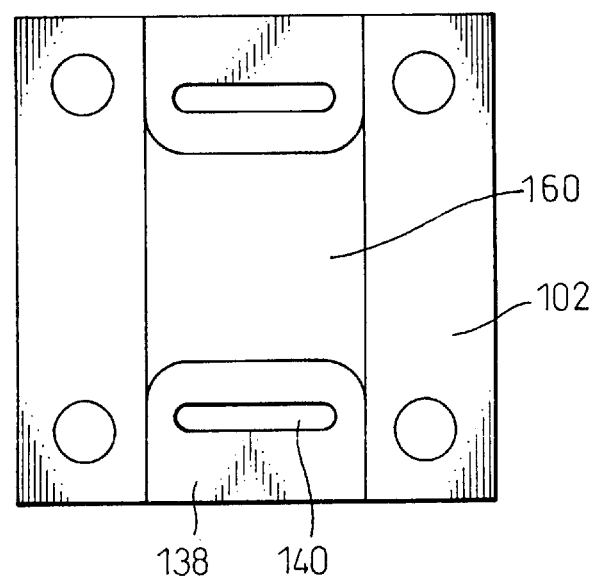
FIG. 22 is a plan view of the body in FIG. 15.

The body 102 is joined and fixed to the lower end surface of the cylinder body by bolts and nuts, etc. (not shown), and a groove 160 having a rectangular cross section and receiving the tube body 109 is provided on the axis of the flow passage of the body 102. Also, on both ends of the slit 121 is provided a groove 138 which receives the fitting portion 137 of the connecting body carrier 111 and which is deeper than the slit 121. Further provided in the groove 138 is a recessed groove 140 receiving a ledge portion 139 arranged on the tip of the fitting portion 137 of the connecting body carrier 111 for preventing the carrier 111 from slipping out (see FIG. 22).

Next, the components constituting the connecting portion will be explained below.

Figure 23:
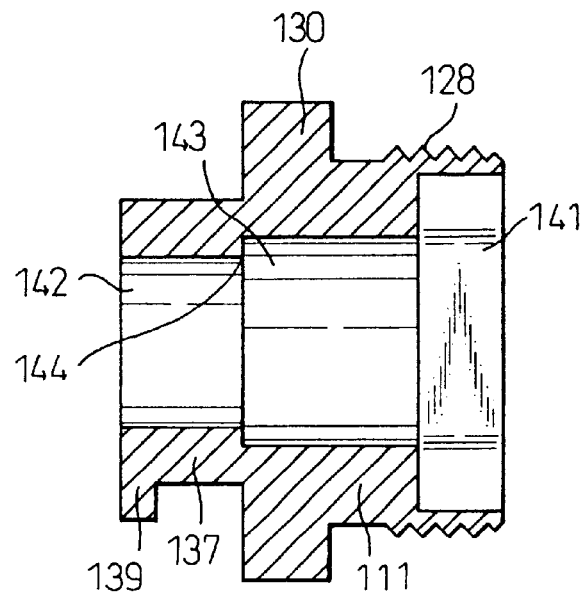
FIG. 23 is a longitudinal cross section of the connecting body carrier in FIG. 15.
Figure 24:
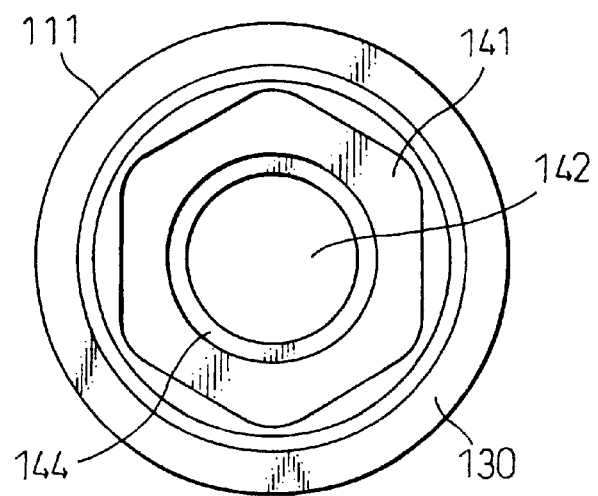
FIG. 24 is a right side view of the connecting body carrier in FIG. 23.

The connecting body carrier 111 has formed at one end thereof the fitting portion 137 having a rectangular cross reaction and fitted in the groove 138 provided on both ends of the body 102, and also the bottom of the tip of the connecting portion is provided with the ledge portion 139 for preventing the carrier from slipping out, which is fitted in the recessed groove 140 provided in the groove 138 of the body. On the other hand, on the other end of the connecting body carrier is provided a receiving opening 141 which receives a hexagonal flange 126 of the connecting body 113 and has the same cross section as that of the flange 126, and on the outer periphery of which a male screw portion 128 is provided. On the outer periphery of the connecting body carrier located between the male screw portion 128 and the fitting portion 137 is provided an annular flange 130 having a diameter approximately equal to the diagonal length of the fitting portion 137. The flange 130 contacts the cylinder body 101 and the body 102 to prevent the connecting body carrier 111 from moving into both bodies 101, 102. As shown in FIG. 23, inside the connecting body carrier 111 is provided a through-hole 142 having a diameter approximately equal to the outer diameter of the tube body 109 at the fitting portion 137, and is provided, successive to the through-hole 142, a through-hole 143 communicating with the receiving opening 141 and having a diameter approximately equal to the outer diameter of the tube body 109 which has been fitted on the inserting portion 124 of the connecting body 113 and has been enlarged. Thus, on the inner periphery of the connecting body carrier 111 is defined a stepped portion 144 as shown in FIG. 23. The tube body 109 is clamped within the connecting body carrier 111 by the stepped portion of 144. Further, although a through-hole 142 and a through-hole 143 larger than the through-hole 142 are provided in this embodiment, the through-hole 142 may be solely provided in the connecting body carrier 111 (see FIGS. 23, 24).

The connecting body 113 has a flow passage 145 thereinside, is provided at one end thereof with the inserting portion 124 the outer diameter of which is larger than the inner diameter of the tube body 109 and on which the tube body 109 is fitted and thus is enlarged, and is provided at the other end thereof with a pipeline connecting portion 125 to which the other tube body is connected. In the center of the outer periphery of the connecting body 113 is provided the flange 126 which has a diameter larger than both ends of the connecting body and has a hexagonal cross section. The connecting body 113 is fitted and fixed in the connecting body carrier 111 so that the connecting body cannot pivot, by fitting the flange 126 in the receiving opening 141 of the connecting body carrier 111 and by screwing the cap nut 112 engaged with the flange 126 to the male screw 128 provided on the outer periphery of the connecting body carrier 111. The configuration of the connecting portion is not limited to this embodiment, and other configurations may be used.

The operation of the pinch valve of this embodiment designed as above is as follows.

In the fully closed condition of the pinch valve shown in FIGS. 15, 16, if compressed air is supplied and pressed into the first space portion 131 from the air port 116, the piston 107 begins to slide on the inner periphery of the cylinder portion 115 at the peripheral side surface and to rise in the cylinder portion. As a result, the piston 107 rises, with the upper end surface of the piston compressing the spring 106 via the spring carrier 105, and the pressing piece 108 rises via the connecting portion 120 suspended from the piston 107. Finally, the upper end surface of the pressing piece 108 arrives at the upper end surface of the oval slit 121 provided on the lower end of the cylinder body 101 to stop the rising of the piston 107 and the pressing piece 108, so that the pinch valve is then in the fully open condition (the condition shown in FIGS. 17, 18).

Next, in the fully opened condition of FIGS. 17, 18, if the air supply from the air port 116 to the first space portion 131 is stopped and the air in the first space portion is released into the atmosphere, the piston 107 begins to descend via the spring carrier 105 abutting on the spring 106 due to the repulsive force of the spring, and as a result, the pressing piece 108 also descends via the connecting portion 120 suspended from the piston 107. Finally, the lower end surface of the piston 107 arrives at the bottom surface of the cylinder portion 115 to stop the descending of the piston 107 and the pressing piece 108, so that the pinch valve is then in the fully closed condition (the condition shown in FIGS. 15, 16). At this time, the upper end surface of the pressing piece is located within the oval slit 121 of the cylinder body 101 in order to prevent the pressing piece 108 from pivoting.

Next, a method of adjusting a medium opening degree of the second invention will be explained on the basis of FIG. 19.

In the condition of FIG. 16, i.e., the fully closed condition, if the handle 103 is pivoted in the opening direction, the lower end surface of the spring carrier 105 rises via the connecting bar 104. As a result, the pressing piece 108 is pushed up by the fluid pressure of the fluid flowing in the tube body 109 and the elastic force of the tube body 109, and as a result, the piston 107 rises and the tube body 109 is then in the medium opening degree. Here, the lock nut which has been raised together with the handle 103 and separated from the upper end surface of the cylinder body 101 is fastened until the lower end surface of the lock nut contacts the upper end surface of the cylinder body 101, so that the handle 103 is locked and the medium opening degree of the valve is fixed (the condition in FIG. 19). Since the lock nut 110 prevents the handle 103 from pivoting, the valve does not return to the closed condition.

On the other hand, the compressed air is supplied into the first space portion 131 from the air port 116 in the condition where the valve has been adjusted to the medium opening degree, the piston 107 begins to rise, with the peripheral side surface of the piston sliding on the inner periphery of the cylinder portion 115, due to the pressure of the air. As a result, the piston 107 rises, with the upper end surface thereof compressing the spring 106 via the spring carrier 105, and the pressing piece 108 rises via the connecting portion 120 suspended from the piston 107. Finally, the upper end surface of the pressing piece 108 arrives at the upper end surface of the oval slit 121 provided on the lower end surface of the cylinder body 101 to stop the rising of the piston 107 and the pressing piece 108, so that the pinch valve in then in the fully open condition (the condition shown in FIG. 20). Naturally, the connecting bar 104 connecting to the spring carrier 105 also rises, and thus it is a matter of course that the flange 133 of the connecting bar 104 is separated from the bottom surface of the recess 134 of the handle 103.

Next, in the fully opened condition of FIG. 20, if the air supply from the air port 116 to the first space portion 131 is stopped and the air is released into the atmosphere, the piston 107 begins to descend via the spring carrier 105 abutting on the spring 106 due to the repulsive force of the spring, and as a result, the pressing piece 108 also descends via the connecting portion 120 suspended from the piston 107. Finally, the lower surface of the flange 133 of the connecting bar 104 arrives at the bottom surface of the recess 134 provided on the upper portion of the handle 103 to stop the descending of the piston 107 and the pressing piece 108, so that the pinch valve is then in the medium opening degree adjusted condition (the condition of FIG. 19).

As explained above, the pinch valve of this embodiment can not only open and close the flow of the fluid, but also flow the fluid at the medium opening degree of the flow passage. Therefore, in the case of a closed loop pipeline inside an apparatus, such as a semiconductor manufacturing apparatus, the pinch valve can be used as a back pressure valve to maintain the minimum pressure in the pipeline.

The present inventions, having the above constructions, thus have the following superior effects.

1. Since the overall height of the pinch valve is low in comparison with the conventional pinch valve and the pinch valve is very compact, i.e., for example, a side of the rectangular cylinder body can be reduced by up to 35 mm and the overall height of the pinch valve can be reduced by up to 93 mm, the space required for a pipeline can be reduced. Thus, it is possible to couple it to a semiconductor manufacturing apparatus in which a complicated pipeline is arranged, consequently compact the manufacturing apparatus can be made.

2. Since the number of constituent components is less than in the case of a conventional pinch valve, the assembling of the pinch valve can be performed easily and manufactured inexpensively.

3. Due to the pressing piece pressing the tube body being semicircular in shape, the durability of the tube body is improved in comparison with the conventional pinch valve, and thus the life of the pinch valve is greatly extended.

4. Since the opening degree of the pinch valve can be adjusted, a fine flow rate of fluid is possible.

What is claimed is:

1. A pinch valve comprising a tube body made of an elastic body; a cylinder body having a cylinder portion thereinside and joined to a disk-like cylinder cover at the upper portion thereof; a piston sliding up and down on the inner periphery of the cylinder portion in a sealing manner and having a connecting portion suspended from the center of the lower surface of the piston to penetrate a through-hole provided in the center of the lower surface of the cylinder body in a sealing manner; a pressing piece fixed to the lower end of the connecting portion of the piston and contained in an oval slit provided on the bottom surface of the cylinder body perpendicularly to the axis of a flow passage; a body joined and fixed to the lower end surface of the cylinder body, having a groove for receiving the tube body on the axis of the flow passage, and having grooves for receiving connecting body carriers which are arranged on both ends of the groove for receiving the tube body and are deeper than the groove; a pair of connecting body carriers each having a fitting portion fitted in the groove of the body at one end of the carrier and a connecting body carrier port on the inner surface of the other end of the carrier and having a through-hole receiving the tube body; and a pair of air ports provided on the peripheral side surface of the cylinder body and respectively communicating with a first space portion surrounded by the bottom surface and inner periphery of the cylinder portion and the lower end surface of the piston, and a second space portion surrounded by the lower end surface of the cylinder cover, the inner periphery of the cylinder portion and the upper surface of the piston.

2. A pinch valve, as set forth in claim 1, wherein the connecting body carrier is provided with a ledge portion for preventing the connecting body carrier from slipping out at the tip thereof, and the groove of the body is provided with recessed grooves for receiving the ledge portions of the connecting body carriers.

3. A pinch valve, as set forth in claim 2, wherein the second space portion has a spring installed therein to contact the cylinder cover and the piston.

4. A pinch valve, as set forth in claim 2, wherein the first space portion has a spring installed therein to contact the bottom surface of the cylinder portion and the lower end surface of the piston.

5. A pinch valve as set forth in claim 1, wherein the second space portion has a spring installed therein to contact the cylinder cover and the piston.

6. A pinch valve as set forth in claim 1, wherein the first space portion has a spring installed therein to contact the bottom surface of the cylinder portion and the lower end surface of the piston.

7. A pinch valve as set forth in claim 1, wherein a connecting body having at one end thereof an inserting portion the outer diameter of which is larger than the inner diameter of the tube body and which is inserted in and connected to the tube body, a pipeline connecting portion on the other end of the connecting body, and a flange on the center of a connecting body is fitted in and fixed to a connecting body carrier by engaging a cap nut with the flange and screwing the cap nut to a male screw provided on the outer periphery of the connecting body carrier.

8. A pinch valve, as set forth in claim 1, wherein the material of the tube body is EPDM, fluororubber, silicone rubber, or a composition of these materials.

9. A pinch valve, as set forth in claim 1, wherein the tube body is made of a composition of polytetrafluoroethylene and silicone rubber.

10. A pinch valve comprising a cylinder body having a cylinder portion provided at the upper portion of the inner surface thereof with a screw portion for adjusting the opening degree, and an air port communicating with the lower end portion of the cylinder portion; a cylindrical handle having a recess receiving a spring at the lower portion thereof and having a screw portion screwed to the screw portion for adjusting the opening degree at the outer periphery of the lower portion thereof; a disk-shaped spring carrier clamping the spring with the upper end surface of the recess of the handle; a connecting bar clamping the spring between the handle and the spring carrier by engaging the connecting bar with the upper portion of the handle and by joining the lower end surface of the connecting bar to the spring carrier; a lock nut screwed to the screw portion of the handle to fix the portion of the handle; a piston sliding up and down on the inner periphery of the cylinder portion in a sealing manner and having a connecting portion suspended from the center of the lower surface of the piston to penetrate a through-hole provided in the center of the lower surface of the cylinder body in a sealing manner; a pressing piece fixed to the lower end of the connecting portion of the piston and contained in an oval slit provided on the lower end of the cylinder body perpendicularly to the axis of the flow passage; a body joined and fixed to the lower end surface of the cylinder body and having a groove on the axis of the flow passage for receiving a tube body made of an elastic body; and connecting portions connecting the tube body to the other tubes at both sides of the body.

11. A pinch valve, as set forth in claim 10, wherein the handle, the spring carrier, the connecting bar and the spring are integrally assembled by a bolt penetrating the inside of the spring carrier and the connecting bar, and a nut.

12. A pinch valve, as set forth in claim 10, wherein a connecting body having at one end thereof an inserting portion the outer diameter of which is larger than the inner diameter of the tube body and which is inserted in and connected to the tube body, a pipeline connecting portion on the other end of the connecting body, and a flange on the center of a connecting body is fitted in and fixed to a connecting body carrier by engaging a cap nut with the flange and screwing the cap nut to a male screw provided on the outer periphery of the connecting body carrier.

13. A pinch valve, as set forth in claim 10, wherein the material of the tube body is EPDM, fluororubber, silicone rubber, or a composition of these materials.

14. A pinch valve, as set forth in claim 10, wherein the tube body is made of a composition of polytetrafluoroethylene and silicone rubber.

* * * * *